United States Patent
Fujii et al.

(10) Patent No.: US 10,511,700 B2
(45) Date of Patent: Dec. 17, 2019

(54) COMMUNICATION TERMINAL WITH FIRST APPLICATION DISPLAYING STATUS OF SECOND APPLICATION

(71) Applicant: RICOH COMPANY, LTD., Tokyo (JP)

(72) Inventors: Atsuhiro Fujii, Kanagawa (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/436,388

(22) Filed: Feb. 17, 2017

(65) Prior Publication Data
US 2017/0249764 A1    Aug. 31, 2017

(30) Foreign Application Priority Data

Feb. 25, 2016  (JP) ................... 2016-034371
Sep. 16, 2016  (JP) ................... 2016-181902

(51) Int. Cl.
*G06T 11/60*   (2006.01)
*H04M 1/725*   (2006.01)

(52) U.S. Cl.
CPC .... *H04M 1/72519* (2013.01); *H04M 2250/62* (2013.01)

(58) Field of Classification Search
None
See application file for complete search history.

(56) References Cited

U.S. PATENT DOCUMENTS

| | | | | |
|---|---|---|---|---|
| 5,767,850 A | * | 6/1998 | Ramanathan | G06F 3/0481 715/797 |
| 5,841,977 A | * | 11/1998 | Ishizaki | H04Q 11/0428 709/204 |
| 5,949,414 A | * | 9/1999 | Namikata | G06F 3/0481 715/753 |
| 8,159,506 B2 | | 4/2012 | Yano et al. | |
| 8,438,478 B2 | | 5/2013 | Takami et al. | |
| 8,635,527 B2 | | 1/2014 | Saeki et al. | |
| 8,861,377 B2 | | 10/2014 | Okuyama et al. | |
| 9,035,994 B2 | | 5/2015 | Kato | |
| 9,210,374 B2 | | 12/2015 | Kato | |
| 9,307,197 B2 | | 4/2016 | Kato et al. | |
| 9,319,628 B2 | | 4/2016 | Kato | |
| 9,319,631 B2 | | 4/2016 | Kato et al. | |
| 9,349,352 B2 | | 5/2016 | Kato | |
| 2004/0003042 A1 | * | 1/2004 | Horvitz | G06Q 10/109 709/204 |
| 2006/0181750 A1 | | 8/2006 | Lu et al. | |
| 2007/0058210 A1 | | 3/2007 | Sakuramata | |
| 2007/0058226 A1 | | 3/2007 | Lu et al. | |

(Continued)

FOREIGN PATENT DOCUMENTS

JP        2015-088943        5/2015

*Primary Examiner* — Kee M Tung
*Assistant Examiner* — Patrick F Valdez
(74) *Attorney, Agent, or Firm* — Xsensus LLP

(57) ABSTRACT

A communication terminal including a processor to output a first display image generated by a first application for communication preferentially over a second display image generated by a second application for communication. The processor causes the first application to output state information indicating a state corresponding to an event generated by the second application.

13 Claims, 21 Drawing Sheets

(56) References Cited

U.S. PATENT DOCUMENTS

| | | |
|---|---|---|
| 2007/0070472 A1 | 3/2007 | Kato et al. |
| 2007/0070473 A1 | 3/2007 | Lu et al. |
| 2007/0091394 A1 | 4/2007 | Sakayori et al. |
| 2007/0115491 A1 | 5/2007 | Kato et al. |
| 2007/0133073 A1 | 6/2007 | Shida et al. |
| 2010/0046044 A1 | 2/2010 | Ishizu et al. |
| 2010/0066749 A1 | 3/2010 | Mihara et al. |
| 2010/0067049 A1 | 3/2010 | Kawada et al. |
| 2012/0026525 A1 | 2/2012 | Sakuramata et al. |
| 2012/0140021 A1 | 6/2012 | Tanaka et al. |
| 2012/0140022 A1 | 6/2012 | Kato |
| 2012/0151407 A1* | 6/2012 | Nemoto ............... G06F 3/048 715/795 |
| 2012/0185768 A1* | 7/2012 | Dowd ............... G06F 3/0488 715/702 |
| 2012/0229590 A1* | 9/2012 | Barrus ............ H04L 12/1822 348/14.08 |
| 2012/0274730 A1* | 11/2012 | Shanmukhadas ...... H04N 7/147 348/14.08 |
| 2013/0060926 A1 | 3/2013 | Kato et al. |
| 2013/0242030 A1 | 9/2013 | Kato et al. |
| 2013/0271557 A1 | 10/2013 | Kato et al. |
| 2014/0074932 A1 | 3/2014 | Mihara et al. |
| 2014/0077937 A1 | 3/2014 | Kato et al. |
| 2014/0104373 A1 | 4/2014 | Kato et al. |
| 2014/0118470 A1 | 5/2014 | Kato et al. |
| 2014/0118476 A1 | 5/2014 | Nagase et al. |
| 2014/0253676 A1 | 9/2014 | Nagase et al. |
| 2014/0266978 A1 | 9/2014 | Ishigami et al. |
| 2014/0267565 A1 | 9/2014 | Nakafuji |
| 2014/0292816 A1 | 10/2014 | Shigemasa et al. |
| 2014/0293000 A1 | 10/2014 | Ujiie et al. |
| 2014/0365628 A1 | 12/2014 | Tamura et al. |
| 2014/0368410 A1* | 12/2014 | Imai ...................... G06F 3/1415 345/2.2 |
| 2015/0002514 A1* | 1/2015 | Murata ............... H04L 12/1895 345/467 |
| 2015/0049237 A1 | 2/2015 | Ujiie et al. |
| 2015/0058735 A1 | 2/2015 | Nagase et al. |
| 2015/0077369 A1* | 3/2015 | Nagahara ............. G06F 3/0488 345/173 |
| 2015/0077511 A1 | 3/2015 | Mihara et al. |
| 2015/0222670 A1 | 8/2015 | Inoue et al. |
| 2015/0222855 A1 | 8/2015 | Kato |
| 2015/0229681 A1 | 8/2015 | Tsubone et al. |
| 2015/0245447 A1* | 8/2015 | Murata .................... G09G 3/00 315/291 |
| 2015/0296176 A1 | 10/2015 | Kato |
| 2016/0077783 A1 | 3/2016 | Kato |
| 2016/0105490 A1 | 4/2016 | Kato et al. |
| 2016/0105642 A1 | 4/2016 | Nagase et al. |
| 2016/0127686 A1 | 5/2016 | Nagase et al. |
| 2016/0149960 A1 | 5/2016 | Kato |
| 2016/0165180 A1 | 6/2016 | Kato et al. |
| 2016/0259434 A1 | 9/2016 | Kato |
| 2016/0294571 A1 | 10/2016 | Kato et al. |
| 2016/0295162 A1 | 10/2016 | Kato |
| 2016/0295354 A1 | 10/2016 | Kato et al. |
| 2016/0295626 A1 | 10/2016 | Kato et al. |
| 2016/0330404 A1* | 11/2016 | Nelson ..................... H04N 7/15 |
| 2016/0352787 A1 | 12/2016 | Kato |
| 2016/0366371 A1 | 12/2016 | Kato et al. |
| 2017/0048488 A1* | 2/2017 | Novak .................. H04N 7/147 |

\* cited by examiner

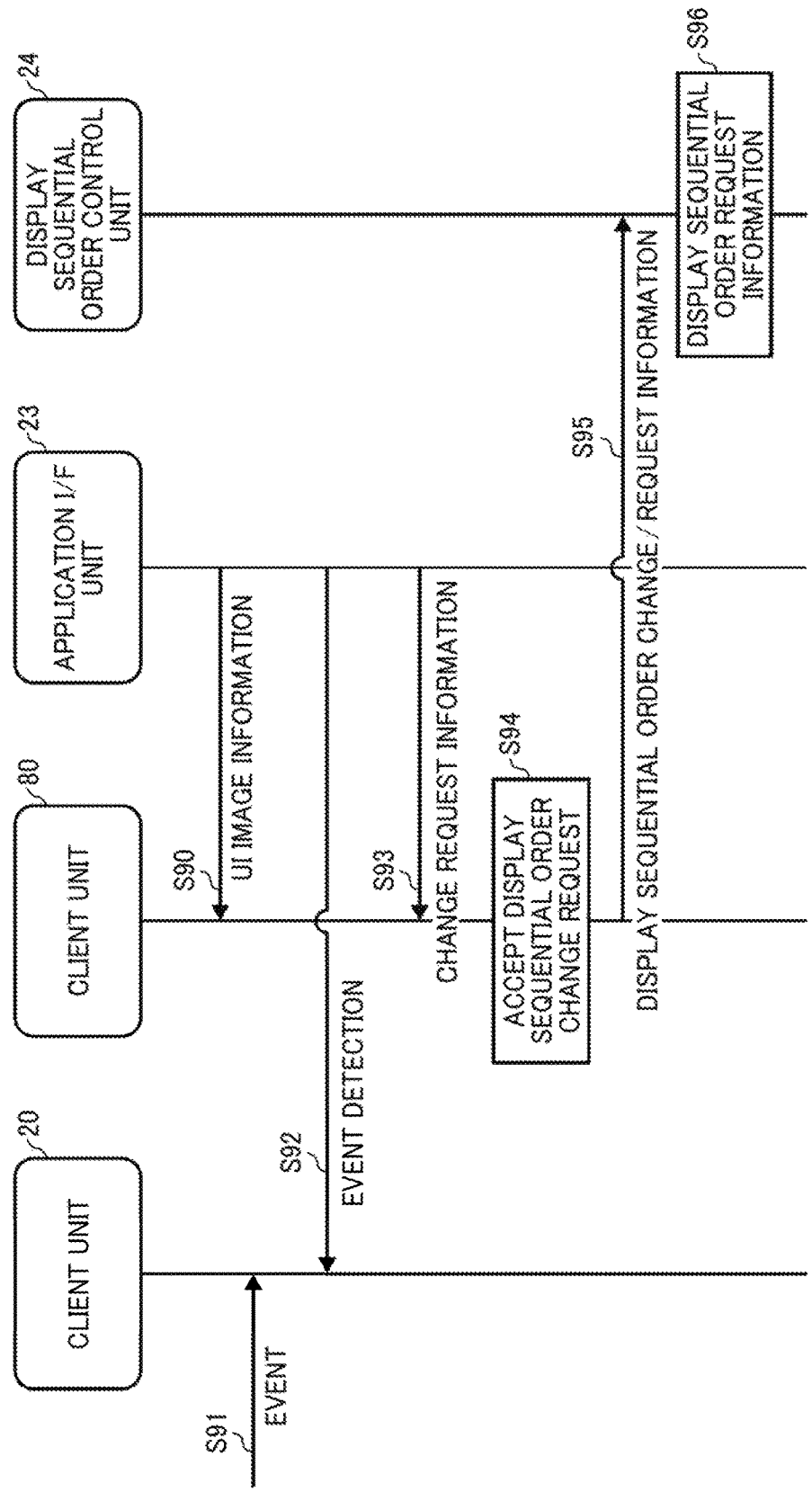

TABLE 1

| PAGE DATA ID | START TIME | END TIME | STROKE ARRAY DATA ID | MEDIA DATA ID |
|---|---|---|---|---|
| p001 | 20150522152034 | 20150522152402 | st001 | m001 |
| p002 | 20150522152415 | 20150522152825 | st002 | m002 |
| p003 | 20150522153345 | 20150522154033 | st003 | m003 |
| ... | ... | ... | ... | ... |

TABLE 2

| st001 | | | | | |
|---|---|---|---|---|---|
| STROKE DATA ID | START TIME | END TIME | COLOR | WIDTH | COORDINATES ARRAY DATA ID |
| s001 | 20150522152202 | 20150522152205 | ff0000 | 2 | c001 |
| s002 | 20150522152612 | 20150522152615 | 000ff0 | 3 | c002 |
| s003 | 20150522152704 | 20150522152712 | ff0000 | 1 | c003 |
| ... | ... | ... | ... | ... | ... |

FIG. 21
TABLE 3

| X COORDINATE VALUE | Y COORDINATE VALUE | DEFERENCE TIME | c001 WRITING PRESSURE | c002 WRITING PRESSURE | c003 WRITING PRESSURE |
|---|---|---|---|---|---|
| 10 | 10 | 100 | 255 | ... | ... |
| 12 | 10 | 200 | 255 | ... | ... |
| 14 | 12 | 300 | 255 | ... | ... |
| ... | ... | ... | ... | ... | ... |

FIG. 22
TABLE 4

| MEDIA DATA ID | DATA TYPE | RECORD TIME | X COORDINATE VALUE | Y COORDINATE VALUE | WIDTH | HEIGHT | DATA |
|---|---|---|---|---|---|---|---|
| m001 | IMAGE | 20150522152632 | 0 | 0 | 1920 | 1080 | abc.jpg |
| m002 | IMAGE | 20150522153002 | 277 | 156 | 1366 | 768 | bcd.jpg |
| m003 | IMAGE | 20150522154217 | 277 | 156 | 1366 | 768 | cde.jpg |
| ... | ... | ... | ... | ... | ... | ... | ... |

FIG. 23
TABLE 5
(DISPLAY MANAGEMENT TABLE)

DISPLAY MANAGEMENT DB2001 (DISPLAY MANAGEMENT TABLE)

| EVENT INFORMATION | FORMAT INFORMATION | DISPLAY CONTENT |
|---|---|---|
| INCOMING | TICKER | INCOMING CALL |
| IN CONFERENCE | BADGE | BADGE 1 |
| CONFERENCE OVER | TICKER | CONFERENCE OVER |
| RECEIVED UPDATE NOTICE | TICKER | THERE IS UN UPDATE |
| RECEIVED DESTINATION REGISTRATION REQUEST | TICKER | A REGISTRATION REQUEST HAS ARRIVED |
| RECEIVED AN INITIAL LOGIN NOTIFICATION | TICKER | AN INITIAL REGISTRATION IS REQUIRED |
| RECEIVED LOGIN SUCCESSFUL | TICKER | YOU ARE NOW LOGGED IN |
| RECEIVED LOGIN FAILURE | TICKER | YOU CAN NOT LOG IN |
| RECEIVED DUAL LOGIN NOTIFICATION | TICKER | YOU ARE LOGGED OUT |
| COMMUNICATION DISCONNECTION | TICKER | THE CONNECTION WITH THE NETWORK DISCONNECTED |
| ERROR DETECTION | TICKER | AN ERROR OCCURRED |
| START SCREEN SHARING | DIALOG | DIALOG 1 |

COMMUNICATION TERMINAL WITH FIRST APPLICATION DISPLAYING STATUS OF SECOND APPLICATION

CROSS-REFERENCE TO RELATED APPLICATIONS

The present application is based upon and claims the benefit of priority of Japanese Patent Application No. 2016-034371, filed on Feb. 25, 2016, and Japanese Patent Application No. 2016-181902, filed on Sep. 16, 2016, the contents of which are incorporated herein by reference in their entirety.

BACKGROUND

1. Field

The present disclosure relates to a communication terminal, a communication system, and a communication controller.

2. Description of the Related Art

Communication systems that perform a telephone call, a video conference, or the like via a communication network, such as the Internet or a dedicated line, have become popular in recent years due to a demand for reducing travel costs and time. In such a communication system, depending on a function that a communication terminal is provided with, content data such as image data of conference participants, image data of conference material, or the like, or stroke data based on handwriting operations, can be shared among the communication terminals.

Moreover, a method of transmitting image data by a session established between an electronic information board and a communication terminal has been disclosed. For example, see Japanese Patent Publication No. 2015-88943.

SUMMARY

In one embodiment, the present disclosure provides a communication terminal including processing circuitry to output a first display image generated by a first application for communication preferentially over a second display image generated a the second application for communication. The processing circuitry causes the first application to display, on the first display image, second state information indicating a second state corresponding to a second event in generated by the second application.

The objects and advantages of the present disclosure will be implemented and attained by the elements and combinations particularly pointed out in the claims. It is to be understood that both the foregoing general description and the following detailed description are exemplary and explanatory and are not restrictive of the invention as claimed.

BRIEF DESCRIPTION OF THE DRAWINGS

FIG. 14 is a sequence diagram depicting processing to control for sequential order of image display.

FIG. 21 illustrates a third table showing coordinate array data.

FIG. 22 illustrates a fourth table showing media data.

FIG. 23 illustrates a display management table.

DETAILED DESCRIPTION OF THE PREFERRED EMBODIMENTS

In one aspect, the present disclosure provides a technique for a user to grasp the state change due to an event occurring in communication by an other communication application when the display by one communication application is given priority over the display by the other communication application.

In the following, embodiments of the present disclosure will be described with reference to the accompanying drawings.

<<Arrangement of Communication System>>

Figure 1:
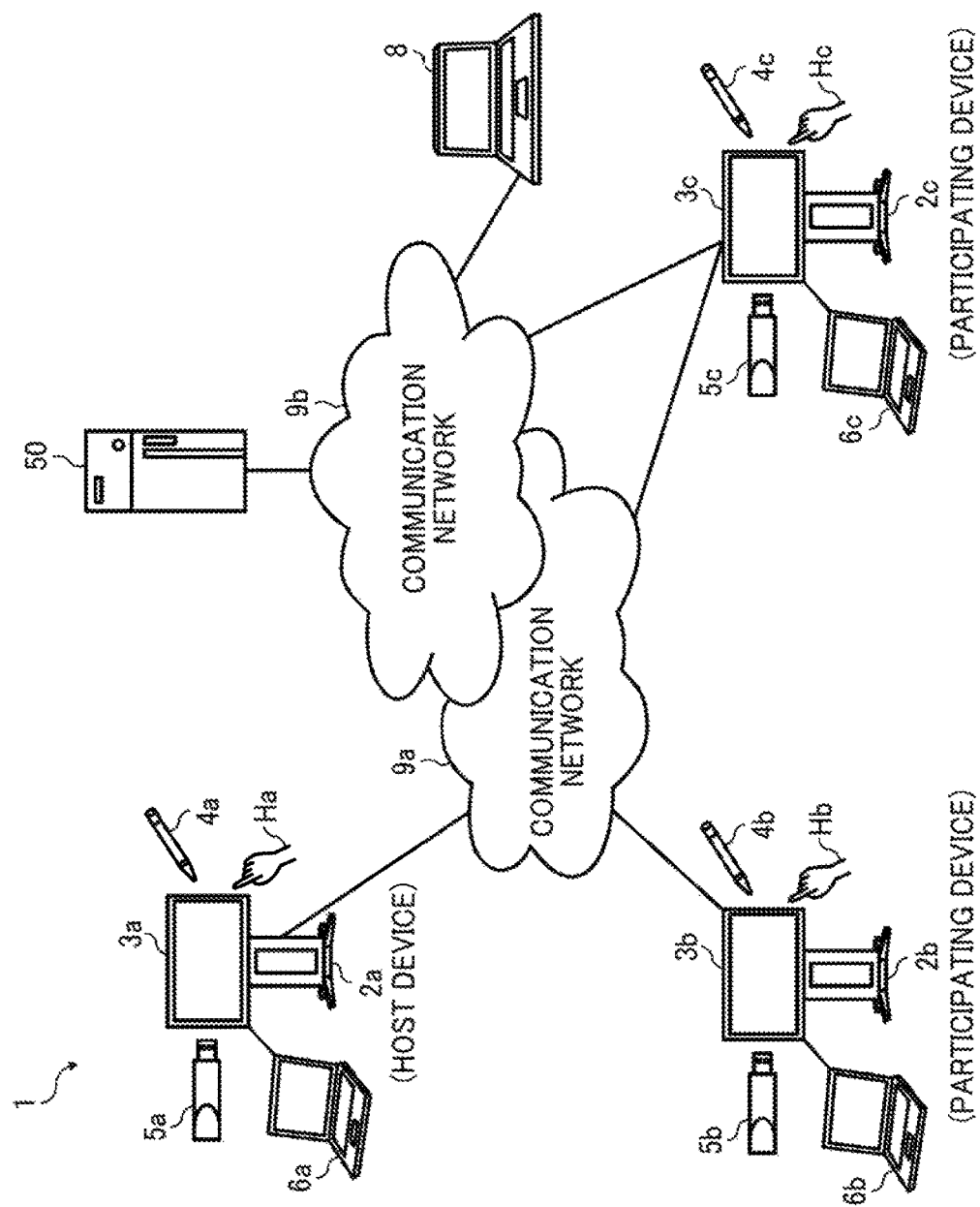
FIG. 1 is a diagram depicting an example arrangement of a communication system according to one embodiment.

At first, with reference to FIG. 1, a communication system 1 will be described. FIG. 1 is a diagram depicting an example arrangement of the communication system according to one embodiment.

The communication system 1 includes a plurality of electronic whiteboards 2a, 2b, and 2c, a PC 8, and a management apparatus 50.

The electronic whiteboards 2a, 2b, and 2c are connected to each other via a communication network 9a to establish a communications connection. Moreover, the electronic whiteboards 2a, 2b, 2c are provided with display devices 3a, 3b and 3c, respectively.

The electronic whiteboards 2a, 2b, and 2c can display images drawn based on events caused by electronic pens 4a, 4b, and 4c (e.g., touches of the nibs of the electronic pens 4a, 4b and 4c or other ends of the electronic pens on the display device 3a, 3b and 3c) on the display devices 3a, 3b, and 3c. In addition, the electronic whiteboards 2a, 2b, and 2c can change images displayed on the display devices 3a, 3b, and 3c based on events caused by not only the electronic pens 4a, 4b and 4c, but also user's hands Ha, Hb, and Hc, or the like (e.g., gestures such as enlargement, reduction, or turning pages). The following description uses the term "electronic whiteboard 2" for indicating an arbitrary one of the electronic whiteboards 2a, 2b, and 2c, the term "display device 3" for indicating an arbitrary one of the display devices 3a, 3b, and 3c, the term "electronic pen 4" for indicating an arbitrary one of the electronic pens 4a, 4b, and 4c, and the term "hand H" for indicating an arbitrary one of the user's hands Ha, Hb and Hc.

Moreover, USB (Universal Serial Bus) memories 5a, 5b, and 5c can be connected to the electronic whiteboards 2a, 2b, and 2c. The electronic whiteboards 2a, 2b, and 2c can read out electronic files in formats such as PDF (Portable Document Format) from the USB memories 5a, 5b, and 5c, and store electronic files into the UBS memories 5a, 5b, and 5c. Moreover, to the electronic whiteboards 2a, 2b, and 2c and laptop PCs 6a, 6b, and 6c can be connected via cables that enable communication using standards such as DisplayPort, DVI (Digital Visual Interface), HDMI (trademark registered) (High-Definition Multimedia Interface), or VGA (Video Graphics Array). The following description uses the term "USB memory 5" for indicating an arbitrary one of the USB memories 5a, 5b, and 5c, and the term "laptop PC 6" for indicating an arbitrary one of the laptop PCs 6a, 6b and 6c.

In this way, stroke data of strokes drawn on the display device 3 of the electronic whiteboard 2 at one location are transferred to the electronic whiteboard 2 at the other location via the communication network 9a, and thereby displayed on the display device 3 at the other location. Conversely, stroke data of strokes drawn on the display device 3 of the electronic whiteboard 2 at the other location are transferred to the electronic whiteboard at the one location via the communication network 9a, and thereby displayed on the display device 3 at the one location. In this way, in the communication system 1, it is possible to perform a remote sharing process of sharing the same image at remote locations, and the communication system 1 is quite useful when it is used for a conference or the like at remote locations.

When another communication terminal other than electronic whiteboard is connected to the communication network 9a, in addition to the electronic whiteboard 2, the other communication terminal can share stroke data with the electronic whiteboard 2. The other communication terminal includes a PC having a stroke sharing function, a video conference terminal, a tablet terminal, a smartphone, a digital signage unit, a telestrator used in a sport relay or a weather forecast, or an image processing apparatus such as a remote image (video) diagnostic device, a portable information terminal, a digital video camera, a digital camera, or a computer such as a terminal that can provide image frames such as a gaming machine.

The electronic whiteboard 2c, the PC (Personal Computer) 8, the relay apparatus 30, and the management apparatus 50 are connected via the network 9b for a communications connection.

The electronic whiteboard 2c and the PC 8 communicate by sending and receiving image data and sound data for a video conference as an example of content data.

The management apparatus 50 manages, in an integrated fashion, communication statuses of the electronic whiteboard 2c and the PC 8.

By using another communication terminal other than the electronic whiteboard 2c and the PC 8 connected to the communication network 9b, the other communication terminal can share display data with the electronic whiteboard 2c and the PC 8. The other communication terminal includes a video conference terminal having an image sharing function, a tablet terminal, a smartphone, a digital signage unit, a telestrator, or an image processing apparatus, a portable information terminal, a digital video camera, a digital camera, or a computer such as a terminal that can provide image frames such as a gaming machine.

The electronic whiteboard 2c can share simultaneously both stroke data, image data, and sound data with a communication terminal by starting both a communication application for sharing the stroke data and a communication application for sharing the display data.

According to one embodiment, the communication network 9a is an intranet, and the communication network 9b is the Internet. However, the communication networks 9a and 9b are selected from arbitrary networks such as the Internet, a LAN (local area network), an intranet, or a mobile telephone network. Alternatively, the communication networks 9a and 9b can be the same communication network such as a case where they are the Internet.

Moreover, according to one embodiment, as an example of a recording medium, the USB memory will be described. However, the present disclosure is not limited to this. The recording medium can be, as another example, various recording media such as an SD card.

<Hardware Configuration of Electronic Whiteboard>

Figure 2:
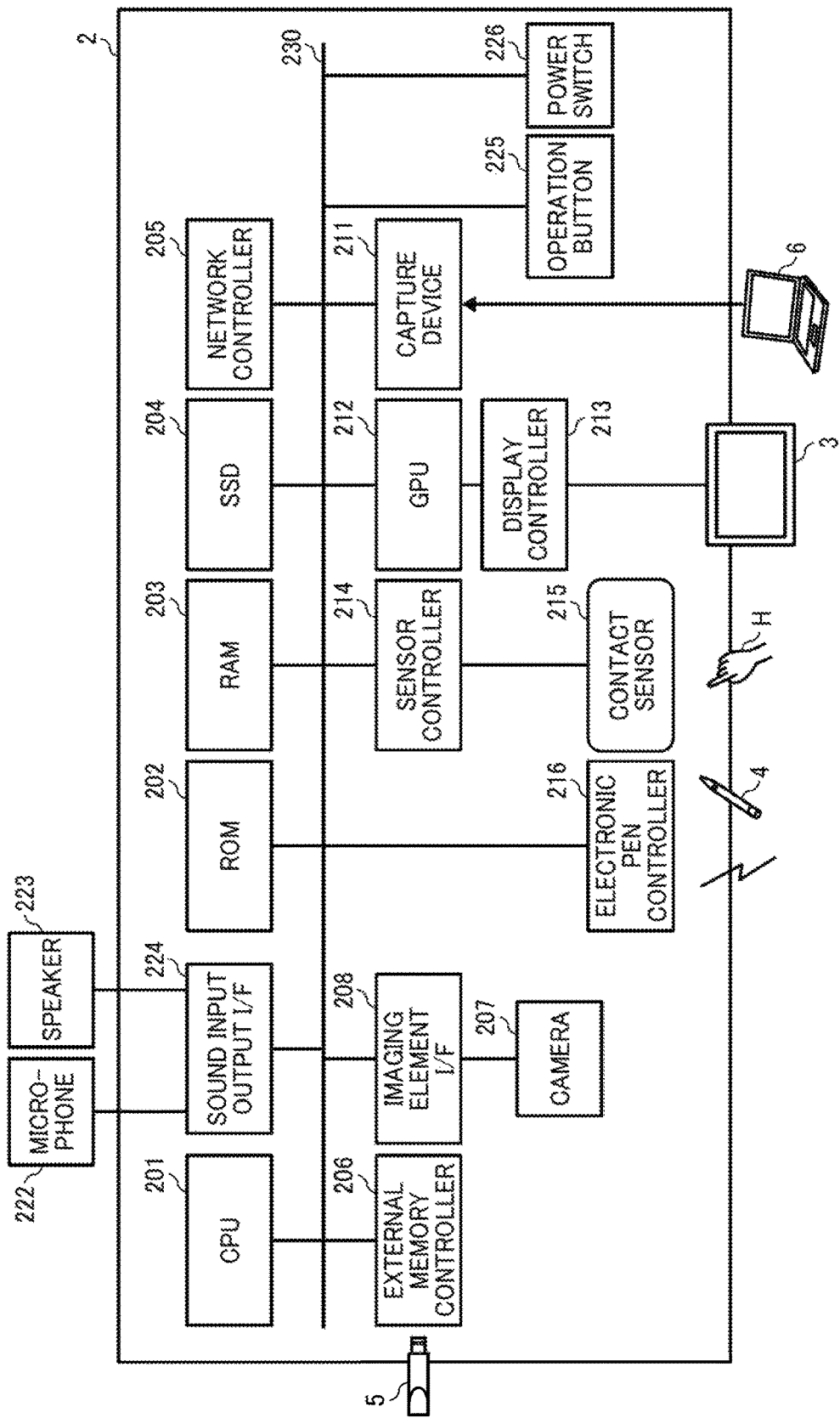
FIG. 2 is a diagram depicting an example hardware configuration of an electronic information board according to one embodiment.

With reference to FIG. 2, a hardware configuration of an electronic whiteboard according to one embodiment will be described. FIG. 2 is a hardware configuration diagram of the electronic whiteboard according to one embodiment.

As shown in FIG. 2, the electronic whiteboard 2 includes a CPU (central processing unit) 201 for controlling an overall operation of the electronic whiteboard 2, a ROM (read-only memory) 202 for storing a program such as IPL used for starting the CPU 201, a RAM (random access memory) 203 used for a work area of the CPU 201, an SSD (solid state drive) 204 for storing various data, such as a program for the electronic whiteboard, a network I/F 205 for controlling communication with the communication network 9a or 9b, and an external storage controller 206 for controlling communication with the USB memory 5. The electronic whiteboard 2 further includes a camera 207 for capturing a subject according to a control by the CPU 201, an imaging element I/F 208 to control driving of the camera 207, a capture device 211 for causing a display of the laptop PC 6 to display video information as a still image or a moving image, a GPU (graphics processing unit) 212 that specializes in graphical processes, and a display controller 213 for controlling and managing screen display for outputting an output image from the CPU 201 to the display device 3. The electronic whiteboard 2 further includes a sensor controller 214 for controlling processing of a contact sensor 215, and the contact sensor 215 for detecting that the electronic pen 4, the user's hand H, or the like contacts the display device 3. The contact sensor 215 according to one embodiment inputs and detects coordinates by an infrared light interruption method. This method of inputting and detecting coordinates is a method of emitting a plurality of infrared light beams parallel to the display device 3 from two reception/emission light devices arranged at respective ends of an upper side of the display device 3 and receiving light that is reflected on a reflection member arranged around the display device 3 and returned on an optical path that is the same as the optical path of the emitted light beam by a light receiving element. The contact sensor 215 outputs ID (identification) of the infrared light beams emitted from the two reception/emission light devices and interrupted by a body to the sensor controller 214. The sensor controller 214 identifies a coordinate position that is a contact position by the body. All of the respective IDs, shown below, are examples of identification information.

The contact sensor 215 is not limited to using the infrared light interruption method, but various detection units can be used, such as a touch panel using a capacitance method that identifies a contact position by detecting a change in a capacitance, a touch panel using a resistance film method that identifies a contact position by a change in an electric voltage between two opposed resistance films, or a touch panel using electromagnetic induction to identify a contact position by detecting electromagnetic induction generated by the contact body contacting the display. Moreover, the contact sensor 215 can determine a contact by using a camera to identify a coordinate position.

The electronic whiteboard 2 further includes an electronic pen controller 216. The electronic pen controller 216 determines a presence of a touch of a pen nib or the other end of the pen on the display device 3 by communicating with the electronic pen 4. The electronic pen controller 216 can determine a presence of a touch of a part of the electronic pen 4 where the user holds or the other part of the electronic pen, not only the pen nib or the other end of the electronic pen 4.

Furthermore, the electronic whiteboard 2 includes a sound input/output I/F 224 for processing input/output of the sound between an external microphone 222 and an external speaker 223 according to a control by the CPU 201, an operation button 225 for accepting a user's operation, and a power switch 226 for switching ON/OFF the electric power of the electronic whiteboard 2. Either the microphone 222 or the speaker 223 can be incorporated in the electronic information board 2.

Furthermore, the electronic whiteboard 2 includes a bus line 230 such as an address bus or a data bus for electrically connecting the respective above-described members to each other.

A program for an electronic whiteboard can be stored in a recording medium such as a CD-ROM readable by a computer or a server on a network, to be distributed or downloaded.

<Hardware Configuration of Management Apparatus>

Figure 3:
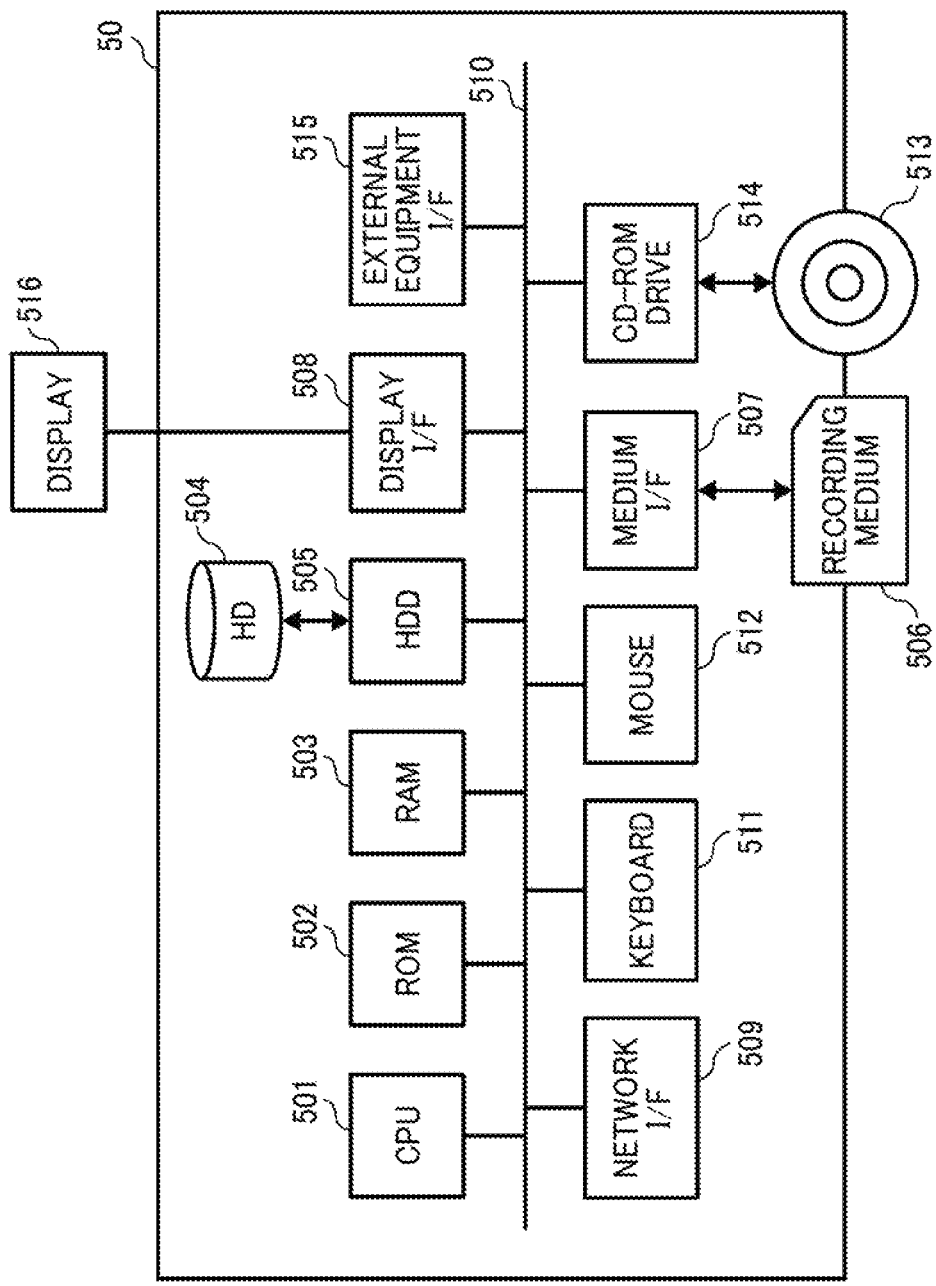
FIG. 3 is a diagram depicting an example hardware configuration of a management apparatus according to one embodiment.

With reference to FIG. 3, a hardware configuration of the management apparatus according to one embodiment will be described. FIG. 3 is a hardware configuration diagram of the management apparatus according to one embodiment.

The management apparatus 50 includes a CPU 501 that controls the overall operation of the management apparatus 50, a ROM 502 that stores a program for executing transmission management, a RAM 503 used as a work area for the CPU 501, an HD (hard disk) 504 that stores various data, a hard disk drive (HDD) 505 that controls reading/writing of various data from/to the HD 504 under control of the CPU 501, and a medium I/F 507 that controls reading/writing (storage) of data from/to a recording medium 506 such as a flash memory. Furthermore, the management apparatus 50 includes a display I/F 508 for displaying various information items such as a cursor, a menu, a window, characters, or an image on a display 516, a network I/F 509 for transmitting data using the communication network 9a or 9b, a keyboard 511 including a plurality of keys for entering characters, numerals, various instructions, or the like, and a mouse 512 that performs selection and execution of various instructions, selection of a processing target, movement of a pointing device such as a mouse cursor, or the like. The management apparatus 50 further includes a compact disc read-only memory (CD-ROM) drive 514 that controls reading/writing of various data from/to a CD-ROM 513 serving as an example of a removable recording medium, an external device I/F 515 for sending/receiving information to/from an external device, and a bus line 510, such as an address bus and a data bus, for electrically connecting the above-described elements.

Moreover, the above-described program for transmission management can be stored in a recording medium readable by a computer such as the above-described medium 506 or the CD-ROM 513 and distributed in a file in an installable format or in an executable format. The above-described program for transmission management can be stored in the HD 504.

<Hardware Configuration of PC>

Figure 4:
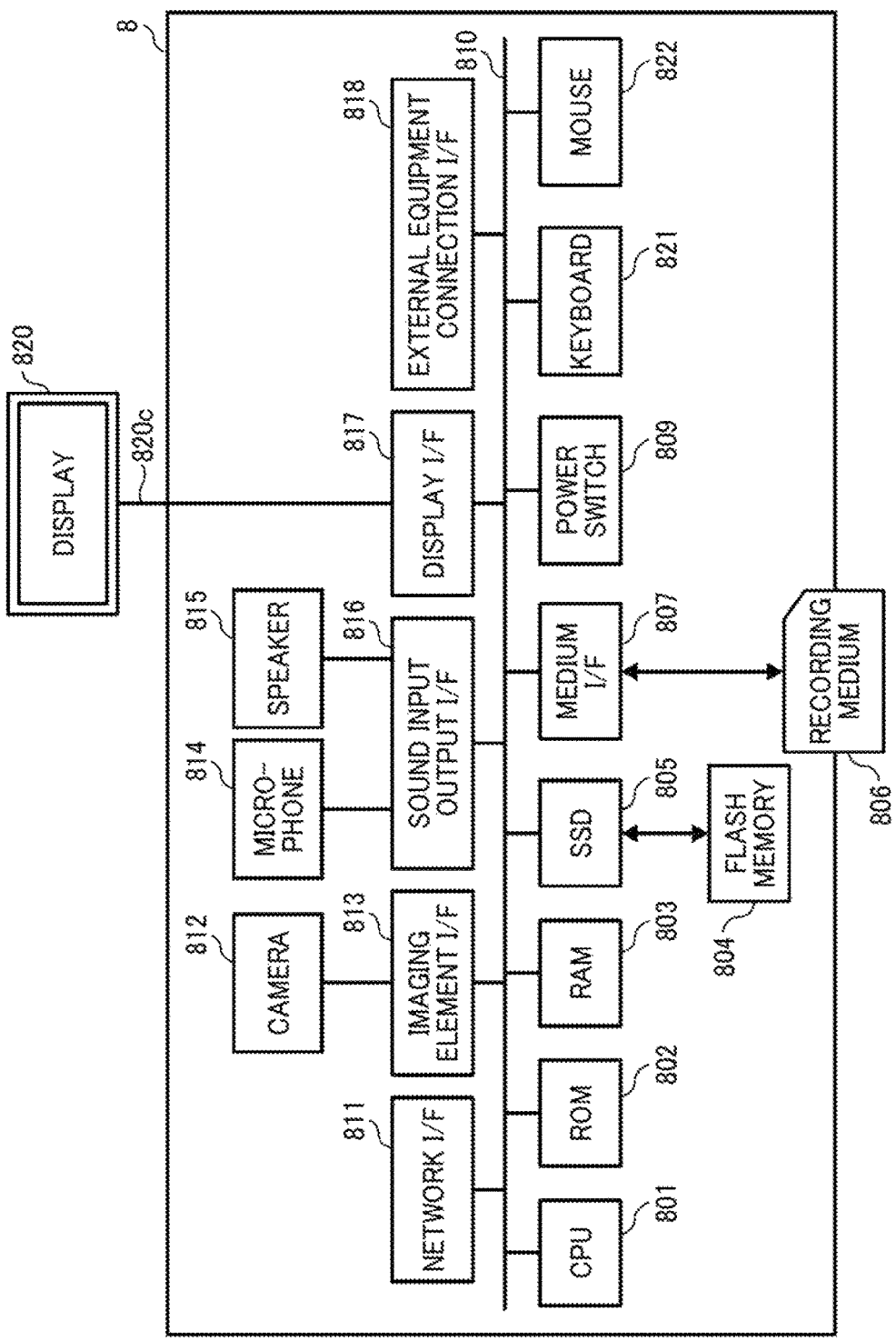
FIG. 4 is a diagram depicting an example hardware configuration of a personal computer (PC) according to one embodiment.

FIG. 4 is a hardware configuration diagram of the PC 8 as a video conference terminal according to one embodiment. The PC 8 includes a CPU 801, a ROM 802, a RAM 803, a flash memory 804, an SSD 805, a media I/F 807, a power switch 809, a bus line 810, a network I/F 811, a camera 812, an imaging element I/F 813, a microphone 814, a speaker 815, a sound input/output I/F 816, a display I/F 817, an external device connection I/F 818, a keyboard 821, and a mouse 822. Among them, the CPU 801 controls an overall operation of the PC 8. The ROM (Read Only Memory) 802 stores a program used for driving the CPU 801, such as an IPL (Initial Program Loader). The RAM (Random Access Memory) is used as a work area of the CPU 801. The flash memory 804 stores various data such as a program for communication, display data, sound data, or the like. The SSD (Solid State Drive) 805 controls reading/writing of various data from/to the flash memory 804 under control of the CPU 801. An HDD may be used instead of the SSD. The media I/F 807 controls reading/writing (storage) data from/ to the recording medium 806, such as a flash memory.

Moreover, the network I/F (interface) 811 is an interface for performing data communication using the communication network 9b. The camera 812 is a kind of a built-in capturing device for capturing a subject according to control by the CPU 801 to obtain display data. The imaging element I/F 813 is a circuit for controlling driving of the camera 812. The microphone 814 is a kind of built-in sound-collecting device for inputting voice. The sound input/output I/F 816 is a circuit for inputting/outputting a sound signal between the microphone 814 and the speaker 815 according to control by the CPU 801. The display I/F 817 is a circuit for sending display data to an external display device 820 according to control by the CPU 801. The external device connection I/F 818 is an interface for connecting various external devices. The keyboard 821 includes a plurality of keys for inputting characters, numerical values, various instructions, or the like. The mouse 822 performs selection and execution of various instructions, selection of a processing target, movement of a pointing device, such as a mouse cursor or the like.

Moreover, the bus line 810 is an address bus, a data bus, or the like for electrically connecting respective members, shown in FIG. 4, such as the CPU 801.

The display device 820 is a kind of display for displaying an image of a subject, an icon for operation, or the like, made of a liquid crystal or an organic EL. Moreover, the display device 820 is connected to the display I/F 817 via a cable 820c. The cable 820c can be a cable for an analog RGB (VGA) signal, a cable for a component video, or a cable for an HDMI (trademark registered) (High-Definition Multimedia Interface) or DVI (Digital Video Interactive) signal.

The camera 812 includes a lens and a solid-state imaging element that converts light into an electric signal to digitize the image (video) of the subject. As the solid-state imaging element, CMOS (Complementary Metal Oxide Semiconductor), CCD (Charge Coupled Device), or the like is used. To the external device connection I/F 818, external devices such as an external camera, an external microphone, an external speaker, and the like can be connected via a USB (Universal Serial Bus) or the like. When the external camera is connected, according to the control by the CPU 801, the external camera is activated in preference to the built-in camera 812. Similarly, when the external microphone or the external speaker is connected, according to the control by the CPU 801, the external microphone or the external speaker is activated in preference to the built-in microphone 814 or the built-in speaker 815.

Moreover, the recording medium 806 is detachable from the PC 8. The flash memory 804 can be replaced by an EEPROM (Electrically Erasable and Programmable ROM), as long as it is a non-volatile memory from which data can be read or to which data can be written according to the control of the CPU 801.

<Software Configuration>

Figure 5A:
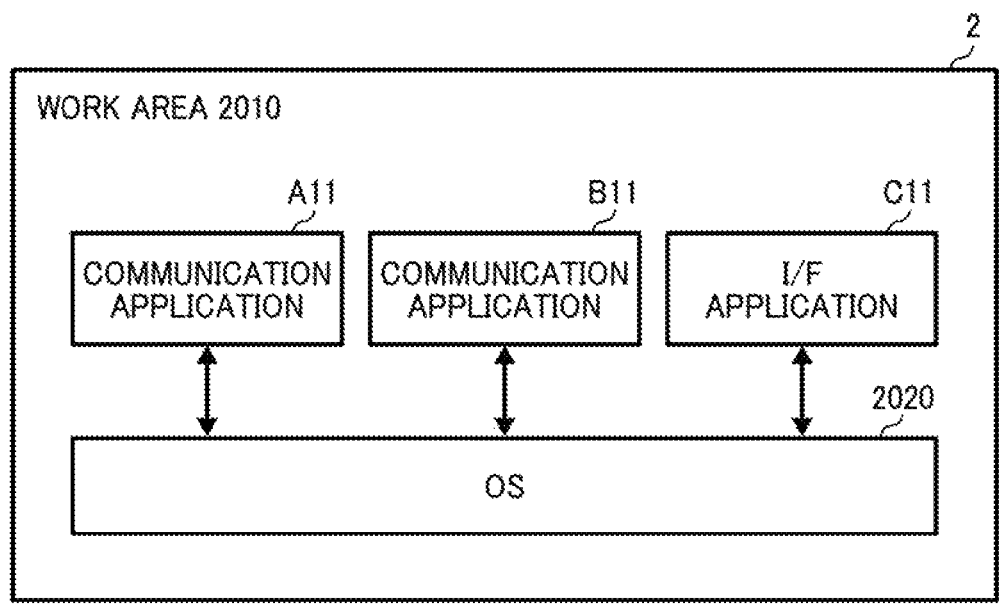
FIG. 5A is a diagram depicting an example software configuration of the electronic whiteboard according to one embodiment.

FIG. 5A is a software configuration of the electronic whiteboard according to one embodiment. As shown in FIG. 5A, an OS (operating system) 2020, a communication application A11, and a communication application B11 operate in a work area 2010 of the RAM 203.

The OS 2020 is basic software that provides a basic function and manages the overall functioning of the electronic whiteboard. The communication applications A11 and B11 are applications for performing communications with the other communication terminal, and have communication protocols that are different from each other. The communication application A11 is a client application to cause the electronic whiteboard 2 to perform a communication control function for sending stroke data to the other communication terminals, and an image processing function for outputting the stroke data as an image. On the other hand, the communication application B11 is a client application that causes the electronic information board 2 to execute a communication control function for transmitting image data and sound data, such as conference video, to and from other terminals, an image processing function for inputting/outputting image data, and a sound processing function for inputting/outputting sound data. The I/F application C11 communicates with the communication applications A11 and B11 activated in the same electronic information board 2, and controls the generation of UI images by the communication applications A11 and B11.

The OS 2020 and the communication application A11 are installed in the electronic information boards 2a, 2b, and 2c prior to factory shipment. Moreover, the communication application B11 and the I/F application C11 can be arbitrarily installed in the electronic whiteboard 2 after factory shipment. In the following description, it is assumed that the communication application B11 and the I/F application C11 are installed in the electronic whiteboard 2c and the communication application B11 and the I/F application C11 are not installed in the electronic whiteboards 2a and 2b.

Figure 5B:
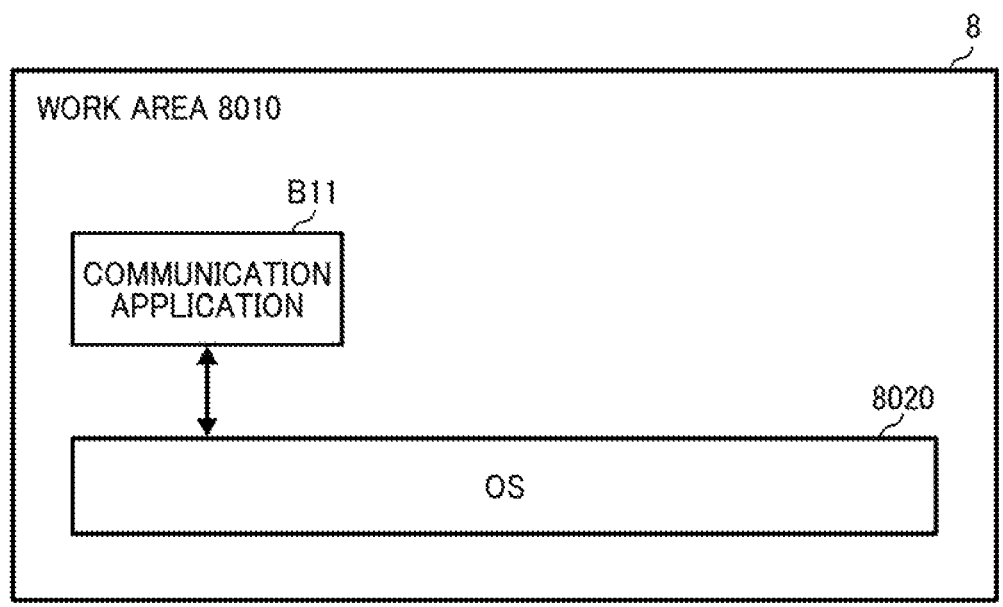
FIG. 5B is a diagram depicting an example software configuration of the PC according to one embodiment.

FIG. 5B is a software configuration diagram of the PC according to one embodiment. As shown in FIG. 5B, the OS 8020 and the communication application B11 operate in a work area 8010 of the RAM 803.

The OS 8020 is basic software that provides a basic function and manages the overall functioning of the PC 8. The communication application B11 causes the PC 8 to perform a communication control function for sending display data, such as conference material, to the other communication terminals, and an image processing function for outputting the display data as an image.

Moreover, the OS 8020 and the communication application B11 are installed in the PC 8 prior to factory shipment or after factory shipment.

Functional Configuration of Embodiment

Figure 6:
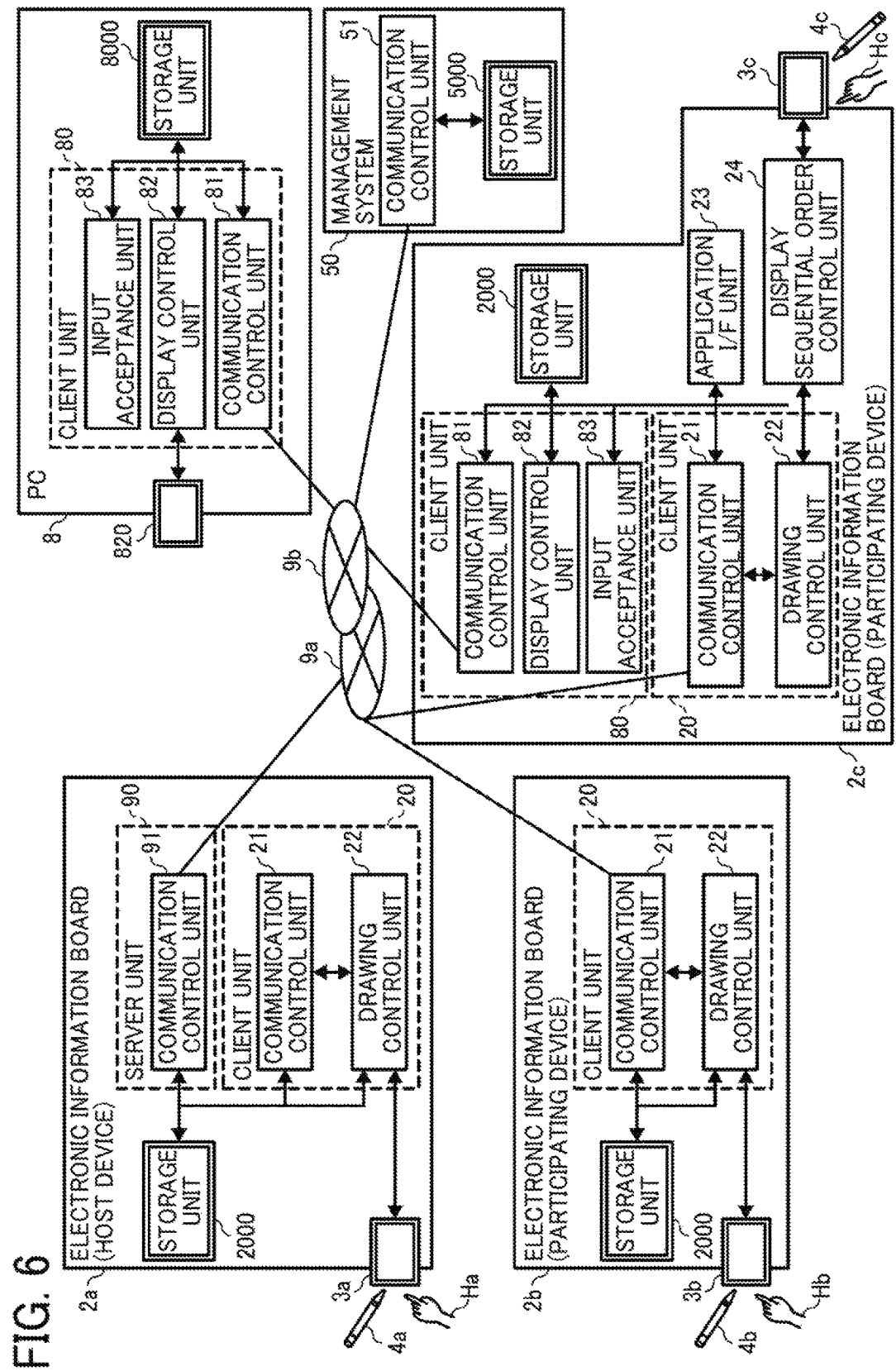
FIG. 6 is a functional block diagram depicting an example of the electronic information board and the PC constituting a part of the communication system according to one embodiment.

Next, a functional configuration of the communication system according to one embodiment will be described. FIG. 6 is a functional block diagram of an electronic whiteboard, a PC, and a management system 50, which form a part of the communication system according to one embodiment. In FIG. 6, electronic whiteboards 2a, 2b, and 2c are connected to each other so that data communication can be performed via a communication network 9a. Moreover, in FIG. 6, the electronic whiteboard 2c, the PC 8 and a management system 50 are connected to each other so that data communication can be performed via the communication network 9b.

The electronic whiteboard 2 enables respective functional configurations shown in FIG. 6 by the hardware configuration in FIG. 2 and one or more programs. Moreover, the electronic whiteboard 2 includes a storage unit 2000 formed with the SSD 204. The PC 8 enables functional configurations shown in FIG. 6 by the hardware configuration in FIG. 4 and one or more programs. Moreover, the PC 8 includes a storage unit 8000 formed with the SSD 805.

The electronic whiteboard 2 can be a "host apparatus" that first starts remote sharing processing, and can be a "participant apparatus" that participates in the remote sharing processing that has been already started. Moreover, the electronic whiteboard 2 includes at least two parts, i.e., a client part 20 and a server part 90. The client part 20 and the server part 90 are functions enabled by the communication application A11 executing in a chassis of the electronic whiteboard 2. In addition, the electronic whiteboard 2 can be provided with the client part 20, and the server 90 can be arranged in an apparatus different from the electronic whiteboard 2, such as a distribution control apparatus.

When the electronic whiteboard 2 is the host apparatus, in the electronic whiteboard 2, the client part 20 and the server part 90 are enabled (executed). Moreover, when the electronic whiteboard 2 is the participant apparatus, in the electronic whiteboard 2, the client part 20 is enabled (executed), but the server part 90 is not enabled (executed). That is, when the electronic whiteboard 2a is the host apparatus and the electronic whiteboards 2b and 2c are the participant apparatuses, the client part 20 of the electronic whiteboard 2a communicates with the client parts 20 of the other electronic whiteboards via the server part 90, which is enabled in the same electronic whiteboard 2a. On the other hand, the client parts 20 of the electronic whiteboards 2b and 2c communicate with the client part of the other electronic whiteboard 2a, 2b or 2c, via the server part 90 enabled in the other electronic whiteboard 2a.

<<Functional Configuration of Client Part 20>>

In the electronic information board 2, when the communication application A11 is activated, the client unit 20 starts operation. The client part 20 includes a communication control unit 21 and a drawing control unit 22.

The communication control unit 21 is enabled by an instruction from the CPU 201 or the network I/F 205, and controls communication with the other electronic whiteboard 2 or communication with a same electric information board 2 in the server part 90.

The drawing control unit 22 is enabled by an instruction from the CPU 201, and performs image processing based on stroke data generated by an operation on the display device 3 or data acquired from the USB memory 5, the laptop PC 6, the communication control unit 21, the storage unit 2000, or the like. Moreover, the drawing control unit 22 performs control for generating an image layer based on the processed data and outputting a superposed image in which they are superposed.

Figure 7:
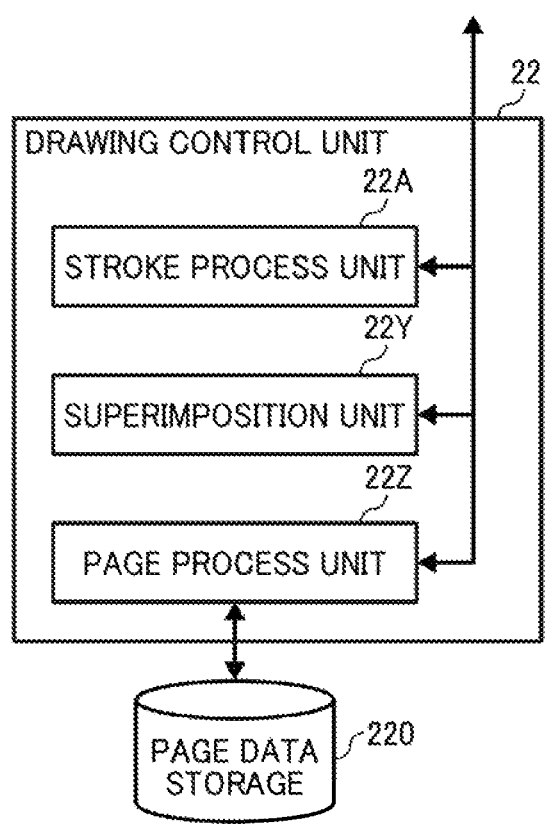
FIG. 7 is a functional block diagram depicting in detail a drawing control unit according to one embodiment.

FIG. 7 is a functional block diagram depicting the drawing control unit according to one embodiment. The drawing control unit 22 includes a stroke processing unit 22A, a superposition unit 22Y, and a page processing unit 22Z.

The stroke processing unit 22A is enabled by an instruction from the CPU 201, and when an event of stroke drawing occurs by an operation of the electronic pen 4 or a hand H on the display device 3, the stroke processing unit 22A performs processing of generating stroke data in response to the operation.

The acquisition unit 22B is enabled by the instruction from the CPU 201, and acquires data stored in the storage unit 2000.

The conversion unit 22X is enabled by an instruction from the CPU 201, and performs processing of converting various data. This conversion can include converting into text, actual data (binary) conversion, serialization, deserialization, encoding, decoding, or the like.

The superposition unit 22Y is enabled by an instruction from the CPU 201, and performs processing of generating image layers based on respective data and superposing the layers.

The page processing unit 22Z merges stroke data and each display data, such as stroke data or like, into a piece of page data and stores it into a page data storage unit 220, which is a part of the storage unit 2000.

Figures 19, 20:
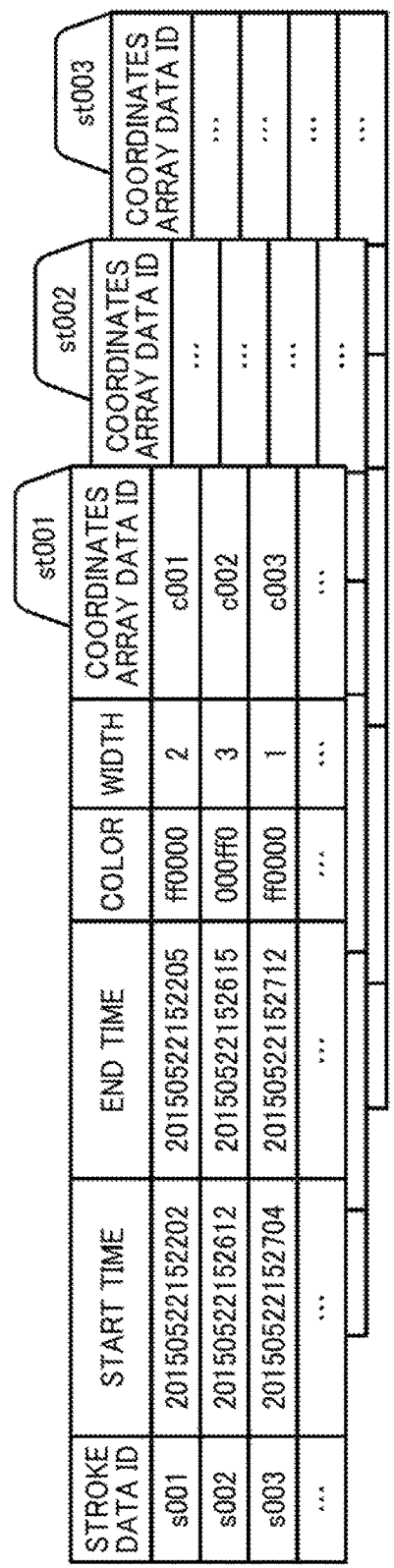
FIG. 19 illustrates a first table showing page data.
FIG. 20 illustrates a second table showing stroke array data.

The page data storage unit 220 is structured in a part of the storage unit 2000, and stores page data, as shown in Table 1 in FIG. 19. Table 1 is a conceptual diagram depicting page data. The page data are data for one page displayed on the display device 3 (stroke array data (respective stroke data) and media data).

The page data stores a page data ID for identifying an arbitrary page, a start time indicating a time when the display of the page starts, an ending time indicating time when alteration of content of the page by stroke, gesture, or the like ends, a stroke array data ID identifying stroke array data generated by a stroke by the electronic pen 4 or the user's hand H, and a media data ID identifying media data, in association with each other. The stroke array data are data by which the stroke image is displayed on the display device 3. The media data are data by which another image superposed with the stroke image is displayed on the display device 3.

Moreover, the stroke array data indicate detailed information, as shown in Table 2 in FIG. 20. Table 2 is a conceptual diagram depicting the stroke array data. As shown in Table 2, a piece of stroke array data is expressed by a plurality of pieces of stroke data. Then, a piece of stroke data indicates a stroke data ID identifying the stroke data, a start time indicating a time when writing of one stroke starts, an ending time indicating a time when the writing of one stroke ends, a color of the stroke, a width of the stroke, and a coordinate array data ID identifying an array of a pass point of the stroke. For example, when the user writes an alphabetic character "S" with the electronic pen 4, the drawing is a single stroke, and one alphabetic character "S" is shown with one stroke data ID. On the other hand, when the user writes an alphabetic character "T" with the electronic pen 4, the drawing includes two strokes, and one alphabetic character "T" is shown with two stroke data IDs.

Furthermore, the coordinate array data indicate detailed information as shown in Table 3 in FIG. 21. Table 3 is a conceptual diagram depicting the coordinate array data. The coordinate array data indicates respective pieces of information of a point on the display device 3 (X-coordinate value, Y-coordinate value), a difference time when passing through this point from the start time of the stroke (ms), and a writing pressure of the electronic pen 4 at this point. That is, a set of points shown in Table 3 is indicated by coordinate array data shown in Table 2. For example, when the user draws an alphabetic character "S" with the electronic pen 4, the drawing is a single stroke. Because it passes through a plurality of pass points until the drawing of "S" ends, the coordinate array data indicate information on the plurality of pass points.

Figure 9:
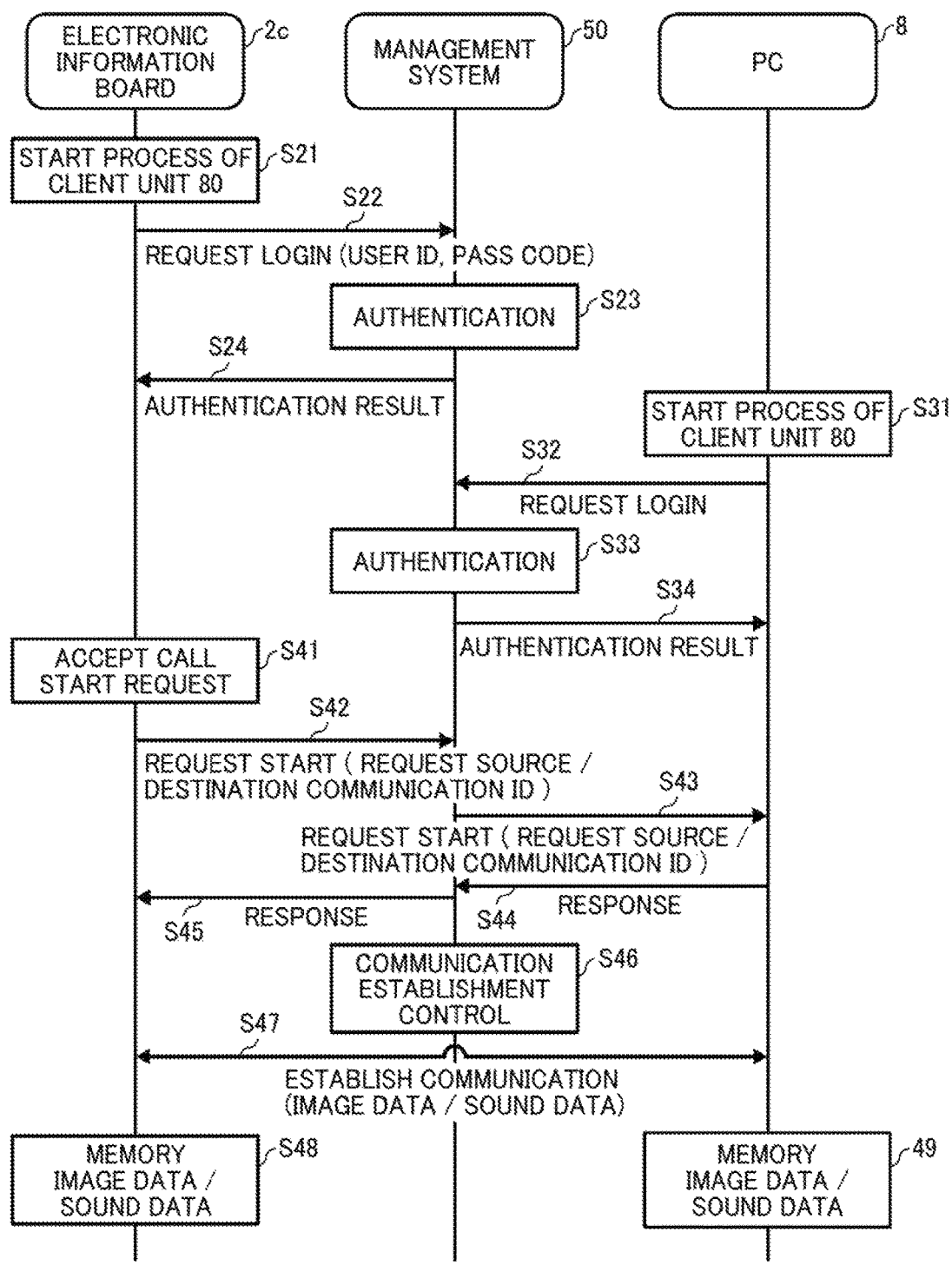
FIG. 9 is a sequence diagram depicting another example of processing for establishment of communication between an electronic information board and the PC.

Moreover, the media data, among the page data shown in Table 1, indicate detailed information, as shown in Table 4 in FIG. 22. Table 4 is a conceptual diagram depicting the media data. As shown in FIG. 9, the media data indicate a media data ID in the page data shown in Table 1, a data category of the media data, a storage time at which the media data is stored, a position (X-coordinate value, Y-coordinate value) of an image displayed on the display device 3 by the media data and a size of the image (width, height), and data indicating a content of the media data, in association with each other. Among them, the position of the image displayed on the display device 3 by the media data indicates a position of an upper left end of the image displayed by the media data where the coordinate of an upper left end of the display device 3 is (X-coordinate value, Y-coordinate value)=(0, 0).

<<Functional Configuration of the Server Part 90>>

The server part 90 includes a communication control unit 91.

The communication control unit 91 is enabled by the instruction from the CPU 201, and controls communication between the communication control unit 21 in the client part in the same electronic whiteboard 2 and a communication control unit 21 in a client part 20 in the other electronic whiteboard 2 via the communication network 9a.

<<Functional Configuration of the Client Part 80>>

When the communication application B11 is started on the electronic information board 2 and the PC 8, the client unit 80 starts its operation. The client unit 80 includes a communication control unit 81, a display control unit 82, and an input receiving unit 83. A communication control unit 81 is enabled by an instruction from the CPU 201 or 801, or the network I/F 205 or the network I/F 811, and controls communication with the other communication terminals.

The display control unit 82 is realized by commands from the CPUs 201 and 801, performs image processing based on data obtained from the storage units 2000, 8000, etc., and performs control to output images. The input receiving unit 83 is realized by a command from the CPUs 201, 801, and receives an operation input by the user.

<<Functional Configuration of the Management System 50>>

The management system 50 implements each functional configuration shown in FIG. 6 by the hardware configuration and program shown in FIG. 3. Further, the management system 50 has a storage unit 5000 constructed from the HD 504.

The communication control unit 51 of the management system 50 is realized by a command from the CPU 501 and controls communication with the electronic information board 2 or the PC 8 via the communication network 9b.

<<Functional Configuration of the Electronic Information Board 2c>>

The electronic information board 2c further includes an application I/F unit 23 and a display sequential order control unit 24. When the I/F application C11 is activated in the electronic information board 2c, the application I/F unit 23 starts operation. The application I/F unit 23 is realized by a command from the CPU 201, and controls the client units 20 and 80 to output predetermined UI images.

When the OS 2020 is started on the electronic information board 2c, the display sequential order control unit 24 starts the operation. The display sequential order control unit 24 is realized by a command from the CPU 201. The display sequential order control unit 24 controls the display sequential order of each image by controlling one of the images created by the client units 20 and 80 to be active and the other to be inactive. Note that the process of actively controlling display of an image is a process of displaying the image in preference to other images, and is a process of displaying the image on the forefront. The process of controlling the display of the image inactive in an inactive manner is a process of displaying other images in preference to the image, and is a process of displaying the image on a surface other than the foremost surface.

Process or Operation of Embodiments

Subsequently, a process according to the embodiments will be described.

(Communication Establishment Process Between Electronic Whiteboards)

Figure 8:
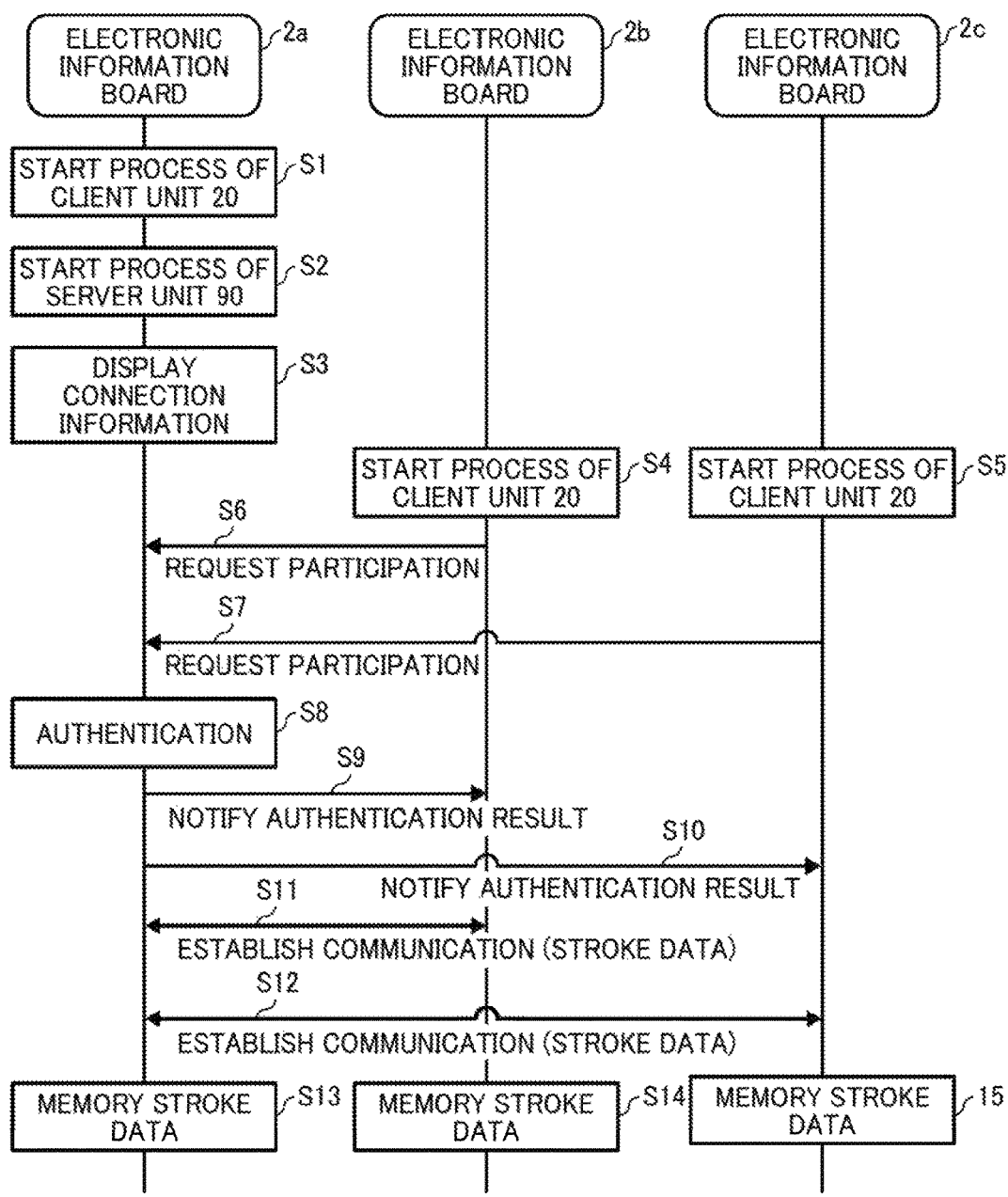
FIG. 8 is a sequence diagram depicting an example of processing for establishment of communication between electronic information boards.

With reference to FIG. 8, a process of establishing communication among the electronic whiteboards 2a, 2b, and 2c by the communication application A11 will be described. FIG. 8 is a sequence diagram depicting an example of processing for establishment of communication between the electronic information boards. When the user turns the power switch 226 of the electronic whiteboard 2a ON, the communication application A11 starts and the process of the client part 20 of the electronic whiteboard 2a starts (step S1). Then, when a request for hosting a conference is accepted by an operation on the display device 3a, an instruction to start the process of the client part 90 is output from the communication control unit 21 of the client part 20 to a communication control unit 91 in the server part 90 of the same electronic whiteboard 2a. Therefore, in the electronic whiteboard 2a, not only the client part 20, but also the server part 90, starts various processes (step S2).

Next, the communication control unit 91 of the electronic whiteboard 2a generates connection information for establishing a connection to the electronic whiteboard 2a and displays the generated connection information on the display device 2a (step S3). The connection information includes an IP address of the host apparatus and a passcode that is generated for this remote sharing processing. This passcode is stored in the storage unit 2000. Then, the connection information is transferred to users of the electronic whiteboards 2b, 2c via telephone or electronic mail by the user of the electronic whiteboard 2a.

Next, in the electronic whiteboards 2b, 2c, when the user turn the power switch 226 of the electronic whiteboard 2b or 2c ON, the communication application A11 starts, and the process of the client part 20 of the electronic whiteboard 2b or 2c starts (steps S4, S5). In the electronic whiteboards 2b, 2c, when an input of the connection information is accepted by an operation on the display device 3b or 3c, the communication control unit 21 in the client part 20 of each of the electronic whiteboards 2b, 2c, based on an IP address of the connection information, via the communication network 9a, sends a passcode to the communication control unit 91 in the server part 90 of the electronic whiteboard 2a, to perform a participation request (steps S6, S7). The communication control unit 91 of the electronic whiteboard 2a receives the participation request (including the passcode) from each of the electronic whiteboards 2b, 2c.

Next, the communication control unit 91 authenticates the passcode received from each of the electronic whiteboards 2b, 2c using a passcode managed in the storage unit 2000 (step S8). Then, the communication control unit 91 reports a result of authentication to the client part of each of the electronic whiteboards 2b, 2c (steps S9, S10). When each of the electronic whiteboards 2b, 2c is determined to be a valid electronic whiteboard by the authentication of step S8, a communication of remote sharing processing is established between the electronic whiteboard 2a that is a host apparatus and the electronic whiteboards 2b, 2c that are participant apparatuses (steps S11, S12). In one embodiment, an example where content data sent among the electronic whiteboards 2a, 2b, and 2c include stroke data will be described.

When the user of the electronic information boards 2a, 2b, and 2c draws a stroke image using the electronic pen 4c, the stroke processing unit 22A of the electronic information boards 2a, 2b, and 2c generates stroke data of the drawn strokes based on the coordinate position of the contact point between the electronic pen 4 and the displays 3a, 3b, and 3c. The communication control unit 21 of the electronic information boards 2a, 2b, and 2c transmits the generated stroke data to the communication control unit 91 of the electronic information board 2a as the host device.

Upon receiving the stroke data sent from the electronic information boards 2a, 2b, and 2c, the communication control unit 91 of the electronic information board 2a transmits the stroke data to the client unit 20 of the electronic information boards 2a, 2b, and 2c. The transmitted stroke data is received by the communication control unit 21 of the electronic information boards 2a, 2b, and 2c. The page processing unit 22Z of the electronic information boards 2a, 2b, and 2c does not overwrite already stored stroke data in the page data storage unit 220. The page processing unit 22Z of the electronic information boards 2a, 2b, and 2c adds newly received stroke data in the page data storage unit 220 and stores them (steps S13, S14, and S15). As a result, after the communication between the electronic information boards 2a, 2b, 2c is established, the page data storage unit 220 of the electronic information boards 2a, 2b, and 2c stores strokes generated by any of the electronic information boards 2a, 2b, and 2c.

(Communication Establishment Process Between Electronic Whiteboard and PC)

With reference to FIG. 9, a process of establishing communication between the electronic whiteboard 2c and the PC 8 by the communication application B11 will be described. FIG. 9 is a sequence diagram depicting another example of processing for establishment of communication between the electronic information board and the PC.

In the electronic information board 2c, when communication application B11 is activated in response to an input start request by a user, the client unit 80 starts various kinds of processing (step S21).

Subsequently, the communication control unit 81 of the client part 80 performs a login request to the management apparatus 50 (step S22). The login request includes a user ID and a passcode. As a result, the communication control unit 51 of the management system 50 receives the login request.

The management apparatus 50 authenticates the electronic whiteboard 2c that is a login request source based on whether or not the set of the user ID and the pass code included in the login request matches the set of the user ID and the pass code stored in advance in the storage unit 5000 (step S23). The communication control unit 51 of the management system 50 sends a result of authentication to the electronic whiteboard 2c that is a login request source (step S24). Therefore, the communication control unit 81 of the electronic whiteboard 2c receives the result of authentication. In the following, an example where it is determined to be a valid login request in step S23 will be described.

In the PC 8, based on an operation of the keyboard 821 or the mouse 822, a start request for the communication application B1 is accepted, the communication application B11 starts, and the process of the client part 80 of the PC 8 becomes capable of starting (step S31).

Subsequently, the communication control unit 81 of the PC 8 transmits a login request to the management system 50 in the same manner as the processing between the electronic information board 2c and the management system 50 (step S32). Then, the management apparatus 50 receives the login request.

The management apparatus 50 authenticates the PC 8 that is a login request source (step S33), and sends a result of authentication to the PC 8 (step S34). In the following, an example where it is determined to be a valid login request in step S33 will be described.

In response to an operation by the user of the electronic information board 2c, the input receiving unit 83 of the electronic information board 2c receives an input of a call start request with the PC 8 (step S41). In response to acceptance of the input of the call start request, the communication control unit 81 of the electronic information board 2c transmits a call start request to the management system 50 (step S42). The call start request includes the user ID used when the electronic information board 2c logs into the management system and the user ID of the destination PC 8. As a result, the management system 50 receives a communication start request.

Next, the management system 50 transmits the call start request to the destination PC 8 (step S43). As a result, the destination PC 8 receives the call start request.

In response to an operation input by the user, the communication control unit 81 of the PC 8 transmits information indicating response availability to the management system 50 (step S44). Hereinafter, a case where the PC 8 transmits information indicating that it responds to the management system 50 will be described.

The communication control unit 51 of the management system 50 receives information indicating that it responds. The communication control unit 51 of the management system 50 transmits the information indicating the above response to the electronic information board 2c of the start request source (step S45). As a result, the communication control unit 81 of the electronic information board 2c receives information indicating that it responds.

Subsequently, the management system 50 performs control for establishing communication for transmitting the content data via the communication network 9b between the electronic information board 2c and the PC 8 (step S46). As a method for establishing communication, for example, the management system 50 authorizes the electronic information board 2c and the PC 8 to access the access destination to the contents data.

The access destination may be in the management system 50 or other than the management system 50. When communication between the electronic information board 2c and the PC 8 is established, the electronic information board 2c and the PC 8 access the access destination. The electronic information board 2c and the PC 8 transmit the video data corresponding to the video taken by the cameras 207 and 812 on the own terminal side and the audio data corresponding to the sound collected by the microphones 222 and 814. Further, the electronic information board 2c and the PC 8 acquire video data and sound data of the other party from the access destination (step S47). The video data and the audio data are streaming data and include image data or sound data of a plurality of still pictures different in the point of time when the images are captured or collected.

Upon receiving the image data and the sound data at the new time point, the communication control unit 81 of the electronic information board 2c overwrites and updates the image data and the sound data stored in the storage unit 2000 with the image data and the sound data at the new time (steps S48, S49). As a result, the latest image data and sound data are stored in the storage unit 2000.

(Image Generation by the Communication Application A11)

Figure 10A:
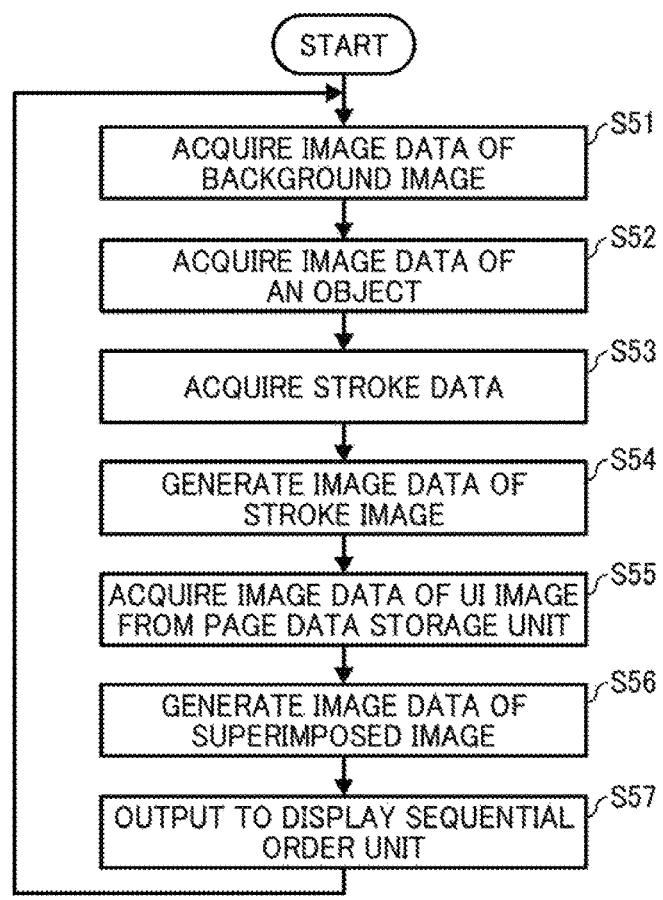
FIGS. 10A and 10B are flowcharts depicting processing for generating an image.

Next, a process of generating an image based on stroke data transmitted between the electronic information boards 2a, 2b, and 2c will be described with reference to FIG. 10A. FIG. 10A is a flowchart showing a process of generating an image by the communication application A11. Hereinafter, a process of generating an image by the communication application A11 of the electronic information board 2c will be described.

As an example, image data (media data) of a background image acquired from the USB memory 5 or the like is stored in the page data storage unit 220. The page processing unit 22Z of the electronic information board 2c acquires the image data of the background image stored in the page data storage unit 220 (step S51).

In the page data storage unit 220, image data (media data) of an object image is stored in advance. The page processing unit 22Z of the electronic information board 2c acquires the image data of the object image stored in the page data storage unit 220 (step S52). The object image is an image indicating a predetermined object such as a circle, a square, a triangle, or the like.

The page processing unit 22Z of the electronic information board 2c acquires the stroke data (see step S15) stored in the page data storage unit 220 (step S53).

The page processing unit 22Z of the electronic information board 2c generates image data of the stroke image based on the stroke data acquired at step S53 (step S54). For example, when stroke data indicating the character "S" is acquired in step S53, the page processing unit 22Z generates image data of the image of "S".

In the page data storage unit 220 of the electronic information board 2c, image data of a UI image (user interface) is stored. The image data of the UI image is, for example, an icon or a button. The page processing unit 22Z of the electronic information board 2c acquires the image data of the UI image stored in the page data storage unit 220 (step S55). Note that among the image data of the UI image stored in the page data storage unit 220, there are a plurality of icons indicating the state of communication.

Among these, the image data acquired by the page processing unit 22Z is controlled by the application I/F unit 23. This process will be described later.

The superimposition unit 22Y of the electronic information board 2c generates image data by using each image data acquired or generated in steps S51, S52, S54, and S55. The superimposition unit 22Y of the electronic information board 2c generates image data of a superimposed image in which a background image, an object image, a stroke image, and a UI image are superimposed in this sequentially order (step S56).

Figure 11A:
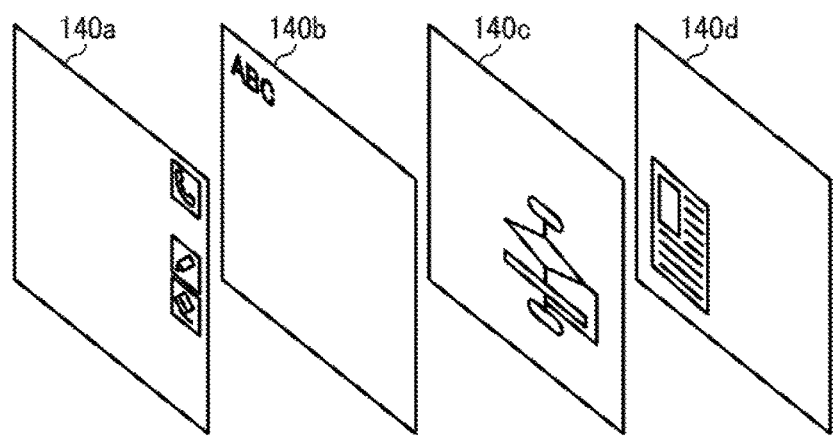
FIG. 11A-11C are schematic diagrams depicting a superimposed image.
Figure 11B:
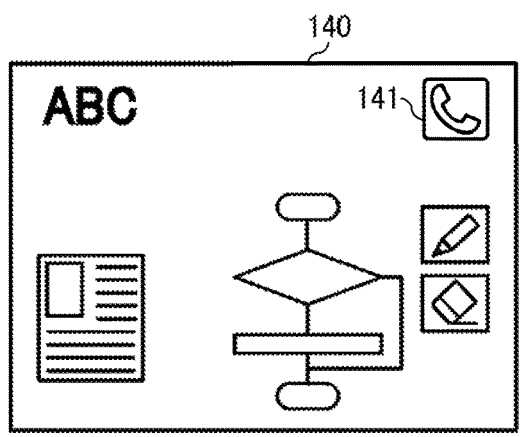

The superimposition unit 22Y outputs the image data of the superimposed image generated in step S56 to the display sequential order control unit 24 (step S57). FIG. 11A is a conceptual diagram showing each image to be superimposed. FIG. 11B is a conceptual diagram showing a superimposed image. As shown in FIG. 11A and FIG. 11B, the superimposed image 140 outputted in step S57 includes a UI image 140a, a stroke image 140b, an object image 140c, and a background image 140d.

While the communication application A11 is activated, the client unit 20 of the electronic information board 2c repeats the processing of steps S51, S52, S53, S54, S55, S56, and S57. As a result, the latest background image, the object image, the stroke image, and the superimposed image in which the UI image is reflected are repeatedly output to the display sequential order control unit 24.

In the repetitive processing, if there is no update in the image data or the stroke data of the background image stored in the page data storage unit 220, the client unit 20 can skip the processing of step S51, or steps S53 and S54. Further, in the repetitive processing, if there is no change in the image data of the object image to be acquired or the image data of the UI image, the client unit 20 can skip the processing of steps S52 and S55. In this case, the previously acquired or generated image data is used for generating the superimposed image.

(Image Generation by the Communication Application B11)

Figure 10B:
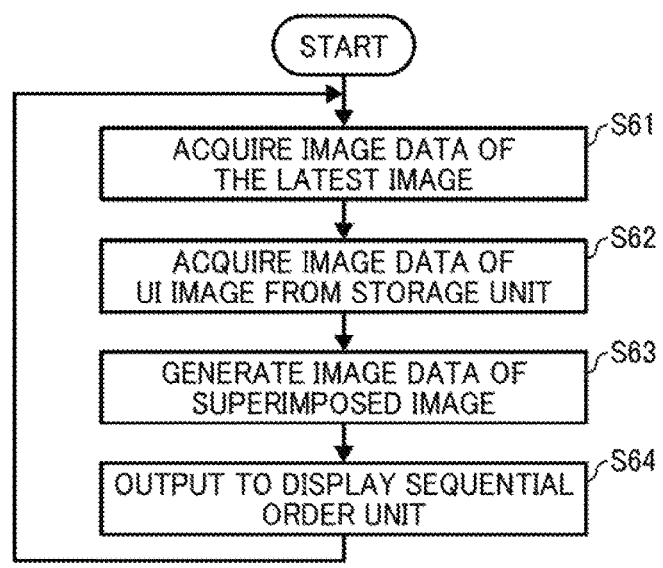

Next, with reference to FIG. 10B, a process of generating an image based on image data transmitted between the electronic information board 2c and the PC 8 will be described. FIG. 10B is a flowchart depicting processing for generating an image by the communication application B11. Hereinafter, a process of generating an image by the communication application B11 of the electronic information board 2c will be described.

The display control unit 82 of the electronic information board 2c acquires image data of the latest image (see step S48) stored in the storage unit 2000 (step S61). It is to be noted that the image data of the latest image is image data of the latest image for constructing the video data received in step S47, and is overwritten and stored in step S48.

The storage unit 2000 of the electronic information board 2c stores the image data of the UI image. The UI image is, for example, an icon or a button. Further, the UI image can be a message corresponding to an event such as "receiving a destination list addition request" or the like. The display control unit 82 of the electronic information board 2c acquires the image data of the UI image stored in the page data storage unit 220 (step S62). Among the image data of the UI image stored in the page data storage unit 220, there are a plurality of icons indicating the state of communication. Among them, the image data acquired by the display control unit 82 is controlled by the application I/F unit 23. This process will be described below.

The display control unit 82 of the electronic information board 2c generates image data of a superimposed image in which the latest image and the UI image are superimposed in order by using the image data acquired in steps S61 and 362 (step S63).

Figure 12A:
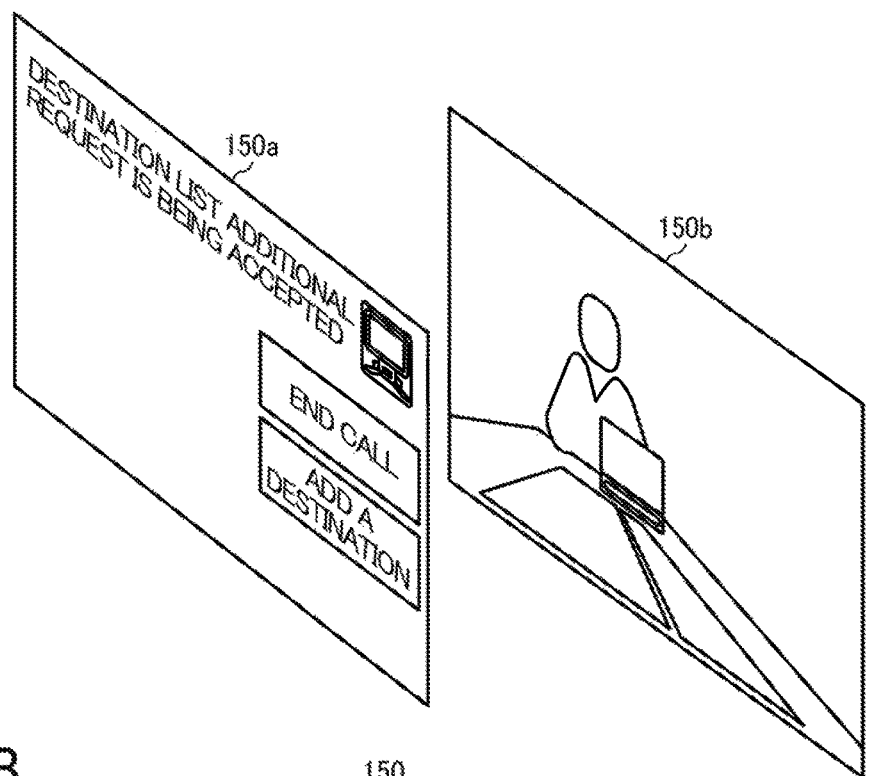
FIG. 12A-12C are schematic diagrams depicting a superimposed image.
Figure 12B:
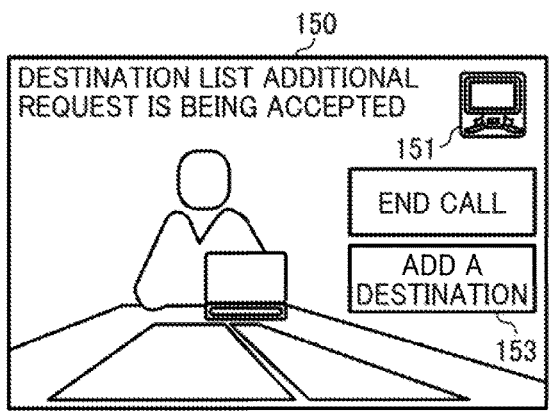

The display control unit 82 of the electronic information board 2c outputs the image data of the superimposed image generated in step S63 to the display sequential order control unit 24 (step S64). FIG. 12A is a conceptual diagram showing each image to be superimposed. FIG. 12B is a conceptual diagram showing a superimposed image. As shown in FIG. 12A and FIG. 12B, the superimposed image 150 output in step S64 includes a UI image 150a and a latest image 150b for constructing an image.

While the communication application B11 is running, the client unit 80 of the electronic information board 2c repeats the processing of steps S61, S62, S63, and S64. As a result, the latest image for constructing the image and the superimposed image on which the UI image is reflected are repeatedly output to the display sequential order control unit 24.

In the repetitive processing, if there is no change in the image data of the UI image to be acquired, the client unit 80 can skip the processing of step S62. In this case, the previously acquired image data is used for generating the superimposed image.

(Display Sequential Order Control)

Figure 13:
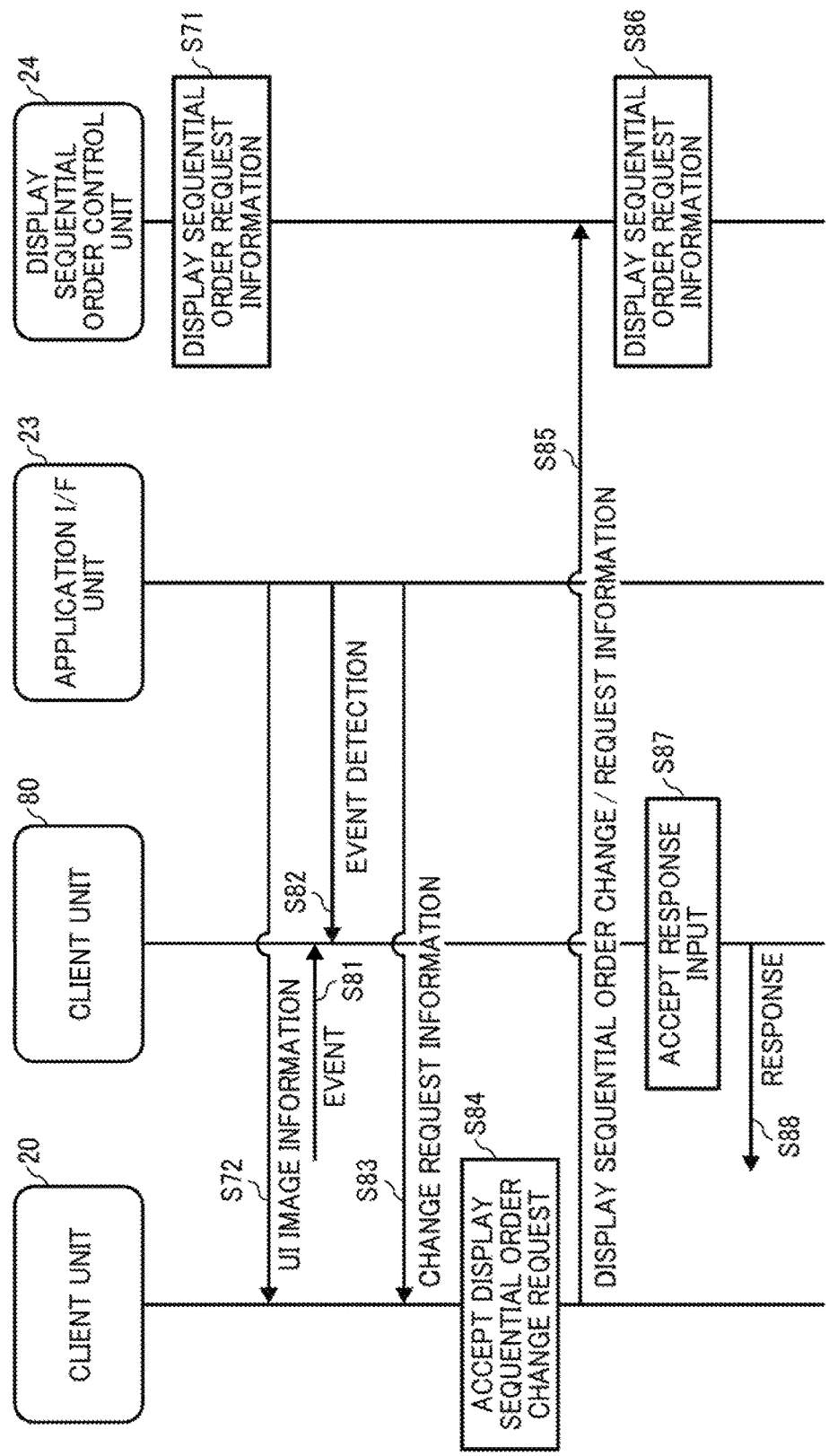
FIG. 13 is a sequence diagram depicting processing to control for sequential order of image display.

Subsequently, with reference to FIG. 13, processing for controlling the display sequential order of the image output by the client unit 20 and the image output by the client unit 80 by the display sequential order control unit 24 of the electronic information board 2c will be described. FIG. 13 is a sequence diagram showing processing for controlling the display sequential order of images. Note that FIG. 13 shows a sequence by each part in the electronic information board 2c.

At the timing when the second application among the communication applications A11, B11 starts, as default processing, the display sequential order control unit 24 outputs the image signal to the display 3c (step S71) so that the image data output from the client unit 20 (see step S57) is displayed actively and the image data output from the client unit 80 (see step S64) is displayed inactive. Note that the display sequential order control is executed, for example, by the OS 2020 by superimposing a display area, such as a window corresponding to the communication application A11, on a display area such as a window corresponding to the communication application B11. When the image output by the client unit 20 is an image of the full screen, the display of the display 3c is occupied by the image output by the client unit 20.

In the page data storage unit 220, image data of icons of predetermined luminance and image data of semi-bright icons are stored as UI images showing the state of the communication application B11. An icon with a predetermined brightness indicates a state in which a predetermined event occurs in the communication application B11. The semi-bright icon indicates a state in which a predetermined event has not occurred in the communication application B11.

At the timing when the second application among the communication applications A11, B11 starts, as a default process, the application I/F unit 23 transmits to the client unit 20 UI image information indicating a semi-bright icon in the UI image showing the state of the communication application B11 (step S72).

When the communication control unit 21 of the client unit 20 receives the UI image information indicating the image data of the semi-bright icon, the page processing unit 22Z acquires the image data of the semi-bright icon at step S55. As a result, the superimposed image output to the display sequential order control unit 24 in step S57 includes the semi-bright icon 141 as shown in FIG. 11B. As a result, even when the image output by the client unit 20 is actively controlled, the user can grasp that a predetermined event is not occurring in the communication application B11 by viewing the semi-bright icon 141.

The application I/F unit 23 detects a predetermined event as a trigger for a state change of the communication application 811. An example of a predetermined event is an event that triggers a change to a state in which the communication application B11 accepts some input from the user. Such an event is reception of a request on the PC 8 side, for example, reception of a request to start a call by the PC 8, reception of a request to add a user of the electronic information board 2c to the destination list on the PC 8 side. Hereinafter, the case where the event is the reception of the addition request to the destination list will be described.

The communication control unit 81 of the electronic information board 2c receives an addition request to the destination list transmitted by the PC 8 as an event (step S81).

The application I/F unit 23 of the electronic information board 2c detects reception of an addition request to the destination list as a predetermined event (step S82). The method by which the application I/F unit 23 detects a predetermined event is not particularly limited. For example, the application I/F unit 23 may transmit information to the communication control unit 81 to confirm whether or not a predetermined event has been received at predetermined intervals such as every 30 seconds. In this case, the application I/F unit 23 can detect the event based on the response from the communication control unit 81 to this information. Further, upon receiving a predetermined event, the communication control unit 81 can transmit information indicating occurrence of an event to the application I/F unit 23. In this case, the application I/F unit 23 detects an event based on the received information.

The application I/F unit 23 of the electronic information board 2c manages the corresponding UI image for each predetermined event. Hereinafter, a case where the application I/F unit 23 manages information indicating an icon of predetermined luminance as a UI image corresponding to reception of an addition request to a destination list will be described. In response to detection of the reception of the addition request to the destination list, the application I/F unit 23 transmits change request information indicating the icon of predetermined luminance corresponding to this event to the client unit 20 (step S83). The change request information is an instruction to change the UI image to the image indicated in the change request information. In this manner, when detecting the event of one of the communication applications A11, B11, the application I/F unit 23 transmits change request information to the other communication applications B11, A11.

The communication control unit 21 of the electronic information board 2c receives the change request information transmitted by the application I/F unit 23. Based on the received change request information, the page processing unit 22Z of the electronic information board 2c acquires the image data of the icon of the predetermined luminance out of the image data of the UI image stored in the page data storage unit 220 at step S55.

Figure 11C:
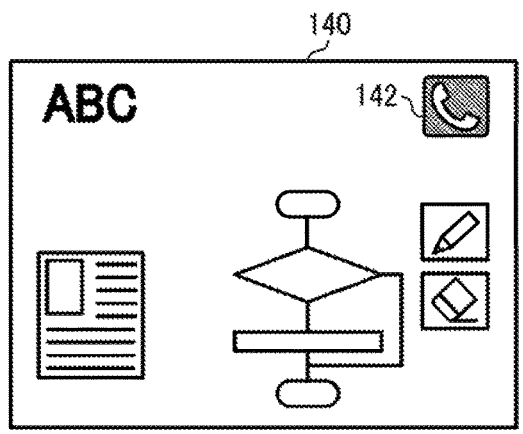

As a result, in step S57, the image of the icon with the predetermined luminance is output as the UI image. FIG. 11C is a conceptual diagram showing a superimposed image changed based on reception of change request information. As shown in FIG. 11C, after receiving the change request information, the superimposed image 140 outputted in step S57 includes the icon 142 of predetermined luminance. As a result, even when the image output by the client unit 20 is actively controlled, the user can grasp that the state has shifted to a state where a predetermined event has occurred in the communication application B11 by viewing the icon 142 of predetermined luminance.

When the user of the electronic information board 2c touches the position where the icon 142 is displayed on the display 3c, the drawing control unit 22 accepts an input of a request for changing the display sequential order on the display 3c (step S84).

In response to the acceptance of the input of the request for changing the display sequential order, the communication control unit 21 of the electronic information board 2c transmits the display sequential order change request information for changing the display sequential order on the display 3c to the display sequential order control unit 24 (step S85).

The display sequential order control unit 24 of the electronic information board 2c receives the display sequential order change request information. In response to the reception of the display sequential order change request information, the display sequential order control unit 24 controls the image output from the client unit 20 to be inactive, which is the transmission source of the display sequential order change request information and controls the image output from the other client unit 80 to be active (step S86). As a result, the image by the communication application B11 as shown in FIG. 12B is output from the display 3c.

When the user of the electronic information board 2c touches the position where the button 153 of the display 3c is displayed, an input acceptance unit 83 receives an input of a permission response to the addition request to the destination list on the PC 8 side (step S87).

In response to accepting the input of the permission response, the communication control unit 81 of the electronic information board 2c transmits a permission response to the PC 8 of the addition request source to the destination list (step S88).

Second Embodiment

Subsequently, the second embodiment will be described with reference to FIG. 14, which differs from the first embodiment. FIG. 14 is a sequence diagram showing a process of controlling the display sequential order of images. In addition, FIG. 14 shows a sequence by each part in the electronic information board 2c.

In the storage unit 2000, image data of icons of predetermined luminance and image data of semi-luminance icons are stored as UI images showing the state of the communication application A11. The icon with the predetermined brightness indicates the state in which the communication application A11 has received the stroke data. The half brightness icon indicates a state in which the communication application A11 has not received the stroke data.

At the timing when the display sequential order is switched in step S86, the application I/F unit 23 transmits the UI image information indicating the semi-bright icon among the UI images showing the state of the communication application A11 to the client unit 80 (step S90).

By the communication control unit 81 of the client unit 80 receives the UI image information indicating the image data of the half brightness icon, the display control unit 82 acquires the image data of the half brightness icon from the storage unit 2000 in step S62. Consequently, the superimposed image output to the display sequential order control unit 24 in step S64 includes the semi-bright icon 151 shown in FIG. 12B. Thus, even when the image output by the client unit 80 is controlled active, the user can grasp that the communication application A11 has not received the stroke data by viewing the semi-bright icon 151.

The application I/F unit 23 detects a predetermined event as a trigger for a state change of the communication application A11. As the predetermined event, there is reception of the stroke data by the communication application A11.

The communication control unit 21 of the electronic information board 2c receives the stroke data transmitted by the communication control unit 91 of the electronic information board 2a as an event (step S91).

The application I/F unit 23 of the electronic information board 2c detects reception of stroke data by the communication control unit 21 of the electronic information board 2c as a predetermined event (step S92).

The application I/F unit 23 of the electronic information board 2c manages information indicating a corresponding UI image for each predetermined event. Hereinafter, a case where the application I/F unit 23 manages information indicating an icon of predetermined luminance as a UI image corresponding to an event of reception of stroke data will be described. In response to the detection of an event of reception of stroke data, the application I/F unit 23 transmits change request information indicating an icon of predetermined luminance corresponding to this event to the client unit 80 (step S93).

Figure 12C:
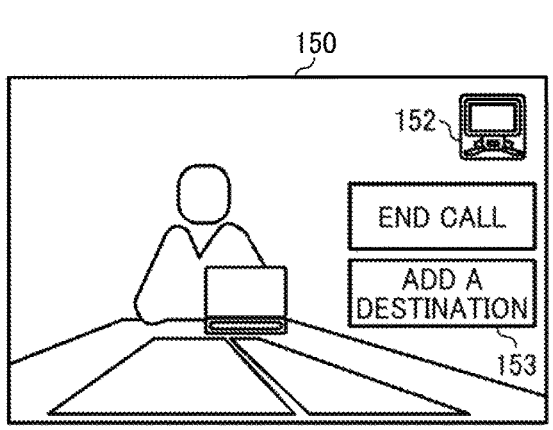

The communication control unit 81 of the electronic information board 2c receives the change request information transmitted by the application I/F unit 23. Based on the received change request information at step S62, the display control unit 82 of the electronic information board 2c acquires the image data of the icon with the predetermined luminance from the image data of the UI image stored in the storage unit 2000. As a result, in step S64, the image of the icon having the predetermined luminance is output as a UI image. FIG. 12C is a conceptual diagram showing a superposed image changed based on reception of change request information. As shown in FIG. 12C, the superimposed image 150 outputted in step S64 includes an icon 152 of predetermined luminance. Thus, even when the image output by the client unit 80 is controlled active, the user can grasp that the communication application A11 has received the stroke data by visually confirming the icon 152 of predetermined luminance.

When the user of the electronic information board 2c touches the position where the icon 152 of the display 3c is displayed, the input receiving unit 83 receives an input of a request for changing the display sequential order on the display 3c (step S94).

In response to accepting input of a request for changing the display sequential order, the communication control unit 81 of the electronic information board 2c transmits display sequential order change request information for changing the display sequential order on the display 3c to the display sequential order control unit 24 (step S95).

The display sequential order control unit 24 of the electronic information board 2c receives the display sequential order change request information. In response to reception of display sequential order change request information, the display sequential order control unit 24 controls the image output from the client unit 80 that is the transmission source of the display sequential order change request information to be inactive and controls the image output from the other client unit 20 to be active (step S96). Thus, when the image output from the client unit 20 becomes active, the user of the electronic information board 2c can confirm the newly added stroke.

Third Embodiment

Subsequently, regarding the third embodiment, points different from the first and second embodiments will be described.

In the first embodiment, the description has been given of the case where the communication applications launched on the electronic information board 2c are two communication applications A11 and B11. In the third embodiment, a case where there are three or more communication applications activated on the electronic information board 2c will be described.

In the third embodiment, when transmitting the change request information in steps S83 and S93, the application I/F unit 23 transmits the identification information of the application in which the event occurred. Subsequently, when transmitting the display sequential order change request information to the display sequential order control unit 24, the communication control units 21 and 81 transmit the identification information of the application received in steps S83 and S93. The display sequential order control unit 24 controls the image output by the application identified by the received application identification information to be active and controls the image output by the other application to be inactive. Through the above processing, even when there are three or more communication applications, the display sequential order control unit 24 can determine which communication application to activate the image.

Fourth Embodiment

Subsequently, regarding the fourth embodiment, points different from the first to third embodiments will be described. In each of the above embodiments, the case where the event is a request from a communication partner or reception of stroke data has been described. However, the event may be various kinds of information that trigger the transition of the state of the communication applications A11 and B11.

For example, the application I/F unit 23 can detect the reception of the authentication result in steps S10 and S24 as an event (See steps S82 and S92). The communication applications A11 and B11 have an on-line state as a result of the above events. For this reason, in response to detection of the event, the application I/F unit 23 transmits change request information for changing the UI image to an icon corresponding to the online state to the client units 20 and 80. The events detected by the application I/F unit 23 in steps S82 and S92 are not limited to events received by the client units 20 and 80. For example, the application I/F unit 23 can detect transmission of a response by the client unit 80 in step S88. The state of the communication application B11 transitions during the call by the trigger of the above event. In response to the detection of the above event, the application I/F unit 23 transmits change request information for changing the UI image to an icon corresponding to the state being busy to the client unit 20.

Fifth Embodiment

Subsequently, regarding the fifth embodiment, points different from the first to fourth embodiments will be described. In the fifth embodiment, in the storage unit 2000 of the electronic information board 2*c*, a display management DB 2001 is constructed with a display management table. As shown in FIG. 23, Table 5 is a conceptual diagram showing the display management table.

In the display management table, event information indicating a predetermined event detected by the application I/F unit 23, format information indicating what type of output format the notification corresponding to the event is displayed, and display content are managed in association with each other. Note that the event information and the format information can each be an event or an ID indicating a format. The display content can be, for example, text indicating display content, a badge or information such as a file name for identifying a dialog.

Upon detecting the event of the client unit 80, the application I/F unit 23 of the electronic information board 2*c* transmits change request information, including event information indicating the detected event, to the client unit in step S83.

The communication control unit 21 of the client unit of the electronic information board 2*c* receives the change request information transmitted by the application I/F unit 23. The drawing controller 22 of the electronic information board 2*c* searches the display management table using the event information included in the received change request information as a search key and acquires corresponding format information and display contents. Then, the drawing control unit 22 generates an image in which the acquired display content is displayed in the form of the acquired format information. In step S56, the superimposing unit 22Y of the electronic information board 2*c* superimposes the generated image on another layer. The display sequential order control unit 24 outputs the image data including the display contents to the display 3*c*.

Figure 15A:
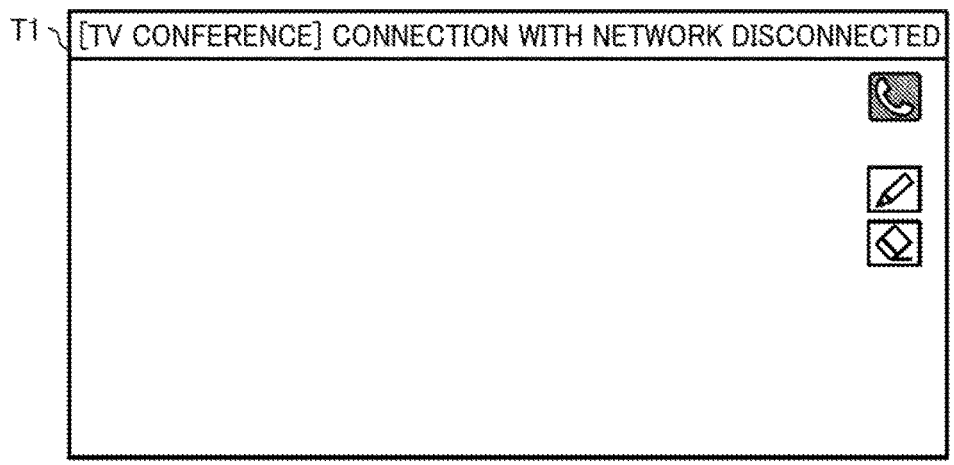
FIG. 15A-15C are diagrams depicting an example display on a display device.

FIG. 15A is a display example of a display when an event of "COMMUNICATION DISCONNECTION" is detected in step S83. In the display management table, the format information "TICKER" and the display content "THE CONNECTION WITH THE NETWORK DISCONNECTED" are associated with "COMMUNICATION DISCONNECTION". For this reason, the drawing control unit 22 generates an image of the ticker T1 including the display contents. The drawing control unit 22 can generate the image of the ticker T1 for a predetermined time such as 10 seconds, for example. Thus, it is possible to prevent deterioration of the visibility of the display by displaying the ticker T1 for a long time.

Figure 15B:
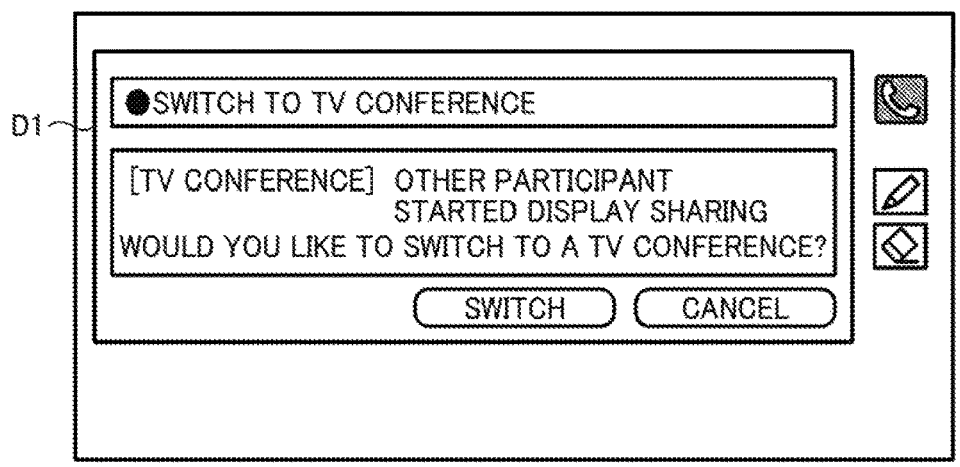

FIG. 15B is a display example of the display when an event of "SCREEN SHARING" is detected in step S83. In "SCREEN SHARING" in the display management table, format information "DIALOG" and display content "DIALOG D1" are associated. The drawing control unit 22 generates an image of the DIALOG D1 specified by these pieces of information. With this dialogue, the electronic information board 2*c* can effectively urge the user to switch the screen. When it is necessary to switch to the other's shared screen in order to communicate like this "SCREEN SHARING" event, it is also possible to enhance the degree of urging a change by using a dialog instead of a ticker.

Figure 15C:

FIG. 15C is a display example of a display when an event (state) "IN CONFERENCE" is detected in step S83. The format information "BADGE" and the display content "BADGE BD1" are associated with "IN CONFERENCE" in the display management table. The drawing control unit 22 generates an image of the BADGE BD1 specified by these pieces of information. The electronic information board 2*c* can cause the user to grasp that the video conference is in progress by the BADGE BD1. In the electronic information board 2*c*, the position and the area of the BADGE BD1 are preset so as not to hinder the display of other interfaces. As a result, the electronic information board 2*c* can continuously display the BADGE BD1 during the conference without disturbing other operations by the user.

In the above description, the example in which the event generated in the client unit 80 is detected by the application I/F 23 and the client unit 20 outputs the information corresponding to the event has been described. An event generated in the client unit 20 is detected by the application I/F 23, and processing for outputting information corresponding to the event in the client unit 80 is executed in the same manner as the above-described processing. However, the transmission destination of the information indicating the event by the application I/F unit 23 is the client unit 80, and the processing by the drawing control unit 22 is replaced with the processing by the display control unit 82.

Sixth Embodiment

Subsequently, regarding the sixth embodiment, points different from the first to fifth embodiments will be described.

Figure 16A:
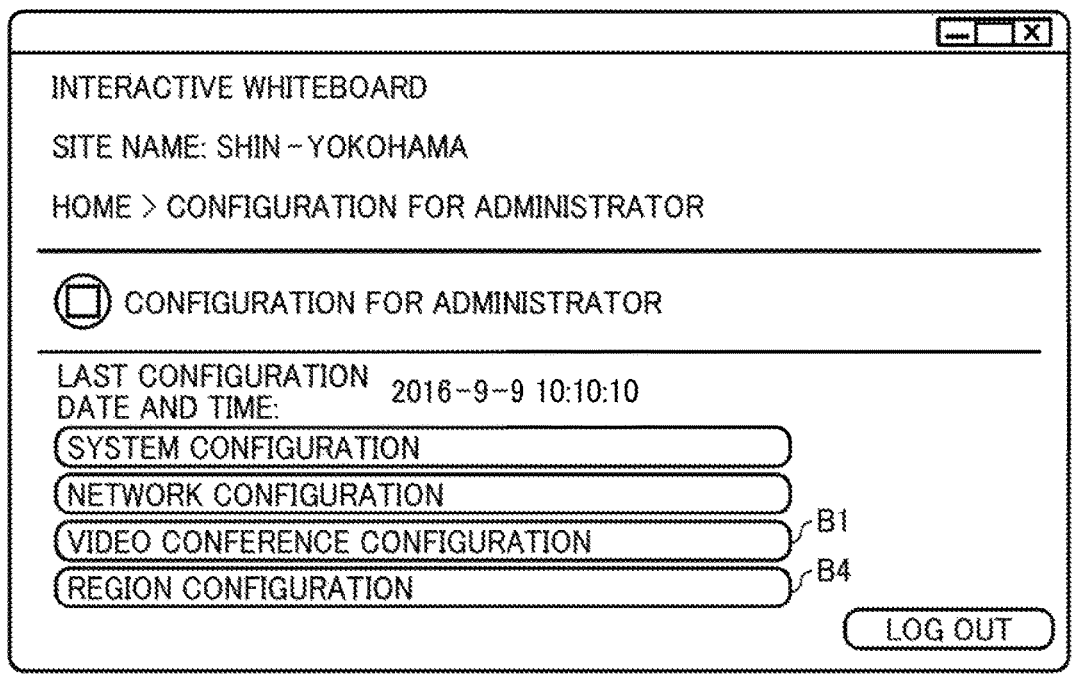
FIG. 16A-16B are diagrams depicting an example display on a display device.

The page data storage unit 220 of the electronic information board 2*c* stores a function setting screen and a video conference setting screen. The page processing unit 22Z of the electronic information board 2*c* acquires the function setting screen stored in the page data storage unit 220 at a predetermined timing such as at the time of activation or upon request by the user. In step S57, the superimposing unit 22Y outputs the superimposed image including the acquired function setting screen to the display sequential order control unit 24. The display sequential order control unit 24 outputs the image data including the function setting screen to the display 3*c*. FIG. 16A is a diagram showing an example of a function setting screen. On the function setting screen, a button B1 for shifting to the TV conference setting screen is included.

Figure 16B:
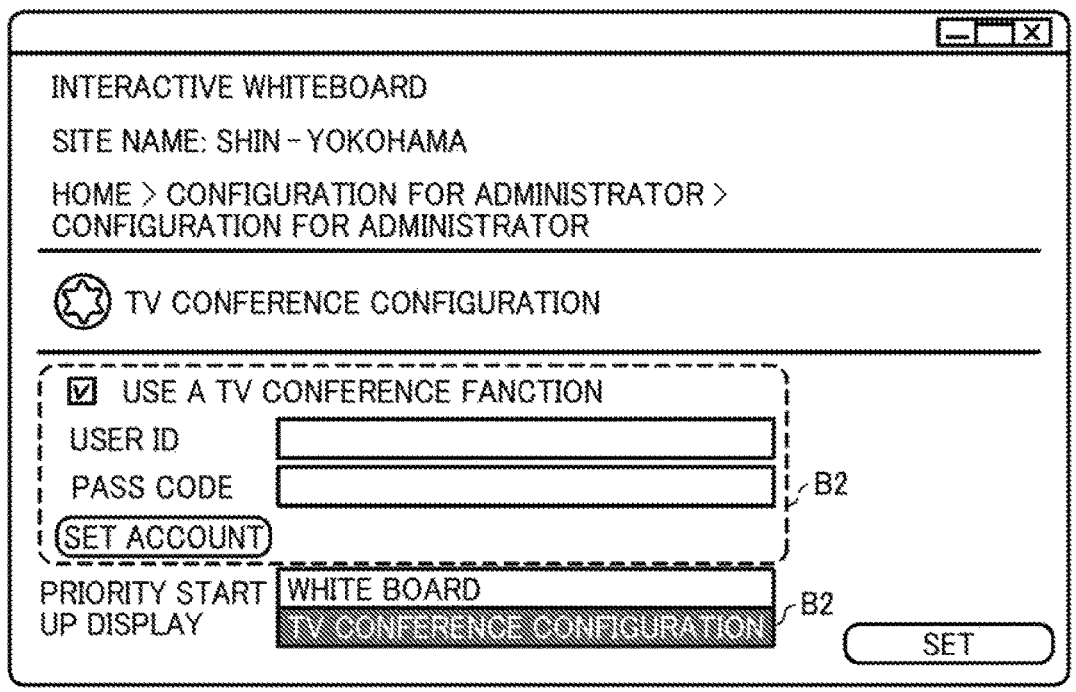

When the user performs an operation of touching the button B1 being output to the display 3*c* with the electronic pen 4*c* or the like, the page processing unit 22Z of the electronic information board 2*c* acquires the video conference setting screen stored in the page data storage unit 220. In step S57, the superimposition unit 22 Y outputs the superimposed image including the acquired videoconference setting screen to the display sequential order control unit 24. The display sequential order control unit 24 outputs the image data including the video conference setting screen to the display 3c. FIG. 16B is a diagram showing an example of a video conference setting screen.

When the user checks a check box for using the video conference function on the input field B2 of the video conference setting screen with the electronic pen 4c or the like and performs an operation to input the user ID and the pass code, the client unit 20 stores the inputted user ID and pass code in the storage unit 2000. When the electronic information board 2 is activated after this setting, the client unit 80 automatically requests the login to the management system 50 based on the user ID and the passcode stored in the storage unit 2000 without accepting the operation by the user.

Furthermore, when the user performs an operation of selecting a video conference as the priority start screen in the input field B3 of the video conference setting screen, the client unit 20 stores the information indicating the screen of the video conference in the storage unit 2000 as the default priority start screen. As a result, when the electronic information board 2 is activated, based on the information indicating the screen of the video conference stored in the storage unit 2000, in step S71, the display sequential order control unit 24 deactivates the image data output from the client unit 20, activates the image data output from the client unit 80, and outputs the image data to the display 3c.

The teleconference setting screen in FIG. 16B includes a regional and language setting button B4. In the electronic information board 2c, when the button B4 is touched by the operation of the electronic pen 4c or the like by the user, the client unit 20 accepts the setting of the area where the electronic information board 2c is used. After the setting, the page processing unit 22Z of the electronic information board 2c can generate an image according to the set area. For example, when Japan is set as the area, the page processing unit 22Z can output the conference setting screen without including the video conference setting button B1. Alternatively, when America is set as the area, the page processing unit 22Z may output a conference setting screen of English managed in advance in response to a request of the conference setting screen.

By connecting the PC to the communication network 9a or 9b in FIG. 1 and inputting the desired electronic information board 2 IP address to the Web browser of the PC for access, the teleconference setting screen of the electronic information board 2 can be displayed on the PC so that the above items and values can be set.

Seventh Embodiment

Subsequently, regarding the seventh embodiment, points different from the first to sixth embodiments will be described.

In the page data storage unit 220 of the electronic information board 2c, an icon 14 for activating the application B11 for videoconference, an icon 15 for maximizing the output screen by the application B11 for video conference and displaying it on the foreground and an icon 16 for minimizing the output screen by the application B11 for videoconference are included as image data of a UI image (user interface).

Figure 17A:
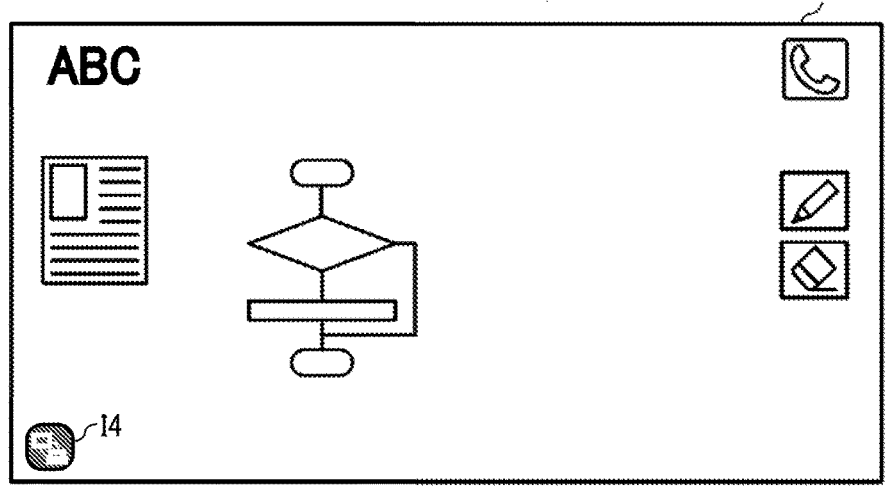
FIG. 17A-17C are diagrams depicting an example display on a display device.
Figure 17B:
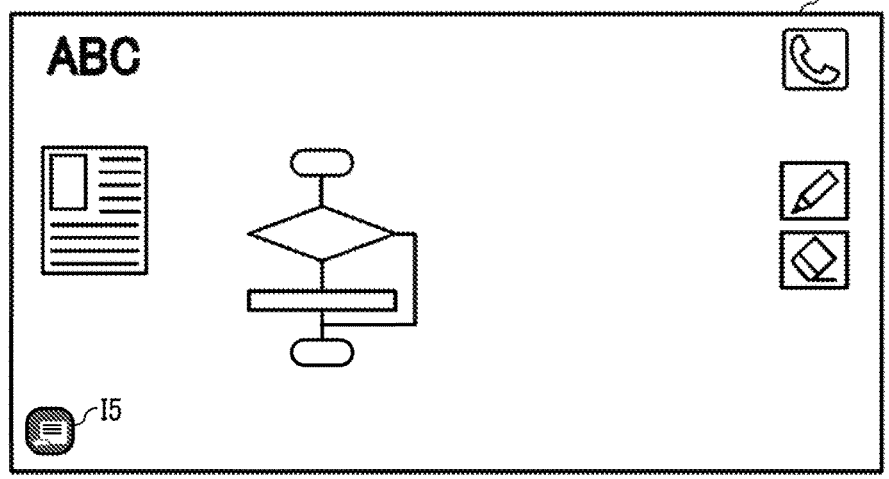
Figure 17C:
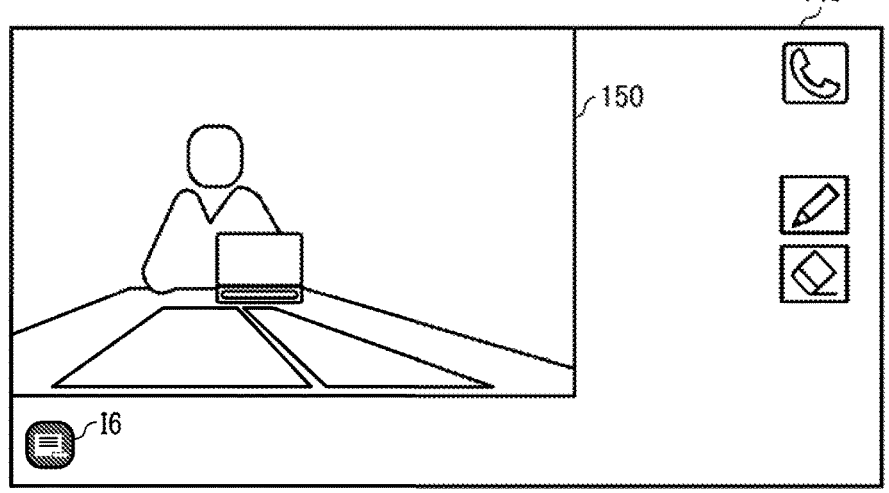

In a case where the application B11 for video conference is not activated, the page processing unit 22Z of the electronic information board 2c acquires the image data of the icon 14 in step S55. When the television conference application B11 is activated, but the output by the application B11 is inactive, the page processing unit 22Z acquires the image data of the icon 15 in step S55. When the application B11 for TV conference is activated and the output by the application B11 is active, the page processing unit 22Z acquires the image data of the icon 16 in step S55. FIGS. 17A to 17C show display examples of the display 3c when the image data of the icons 14, 15, or 16 is acquired in step S55.

Figure 18A:
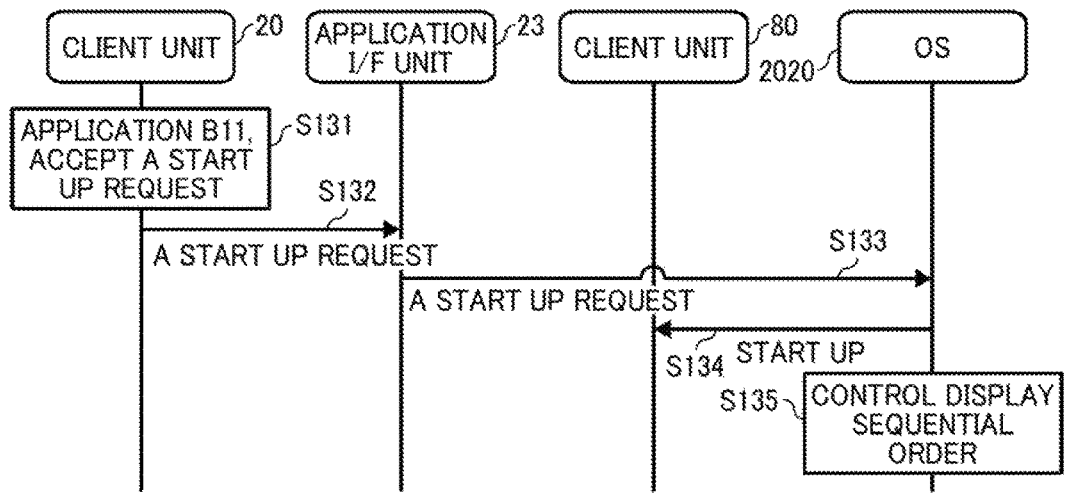
FIG. 18A-18C are flowcharts depicting a process of an electric information board.

FIG. 18A is a flowchart showing processing of the electronic information board 2c when the operation of selecting the icon 14 is executed. As a result of this operation, the client unit 20 of the electronic information board 2c accepts a request (hereinafter referred to as a start request) for activating the TV conference application B11 (step 3131).

The communication control unit 21 of the electronic information board 2c transmits the received activation request to the application I/F unit 23 of the same electronic information board 2c (step S132). The application I/F unit 23 transmits the received activation request to the OS 2020 of the same electronic information board 2c (step S133).

The OS 2020 activates the application B1 in response to the received activation request (step S134). The display sequential order control unit 24 of the OS 2020 controls the image output by the application B11 to be active and displays the image output by the application A11 inactive (step S135).

Figure 18B:
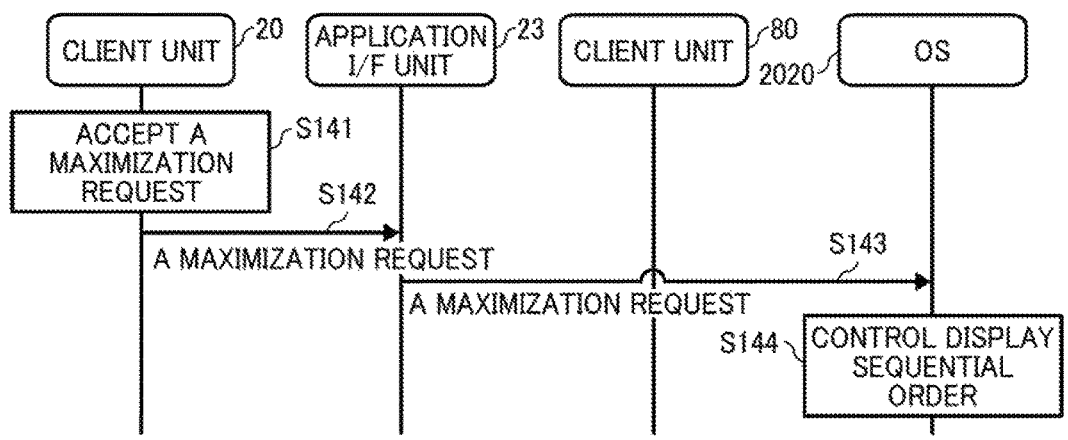

FIG. 18B is a flowchart showing processing of the electronic information board 2c when the operation of selecting the icon 15 is executed. With this operation, the client unit 20 of the electronic information board 2c accepts a request (hereinafter referred to as a maximization request) for maximizing the image output by the application B11 for videoconferencing and displaying it on the foreground (hereinafter, referred to as a maximization request) (step S141).

The communication control unit 21 of the electronic information board 2c transmits the received maximization request to the application I/F unit 23 of the same electronic information board 2c (step S142). The application I/F unit 23 transmits the received maximization request to the display sequential order control unit 24 of the OS 2020 of the same electronic information board 2c (step S143).

The display sequential order control unit 24 of the OS 2020 deactivates the image output by the application A11 according to the received maximization request. Further, the display sequential order control unit 24 of the OS 2020 performs control so that the image output by the application B11 is maximized and displayed so as to be active (step S144).

Figure 18C:
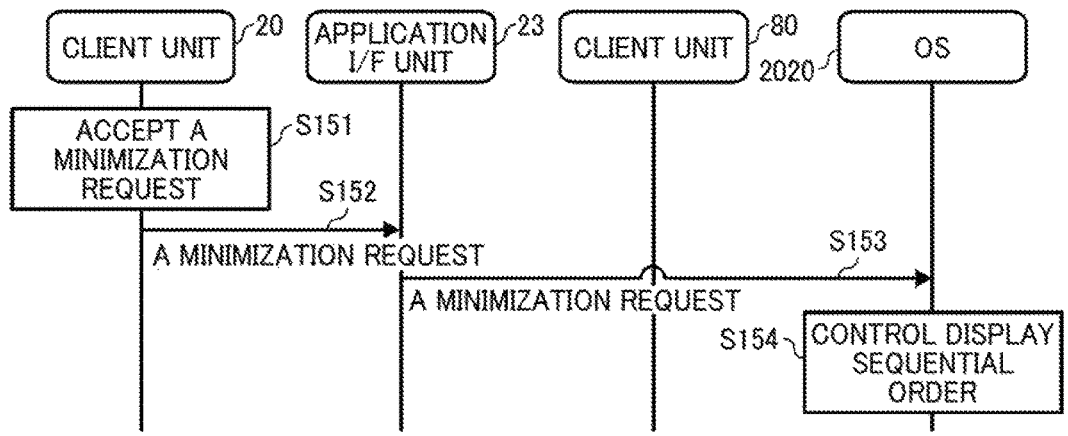

FIG. 18C is a flowchart showing processing of the electronic information board 2c when the operation of selecting the icon 16 is executed. Through this operation, the client unit 20 of the electronic information board 2c accepts a request (hereinafter referred to as a minimization request) for minimizing the image output by the application B11 for videoconference (step S151).

The communication control unit 21 of the electronic information board 2c transmits the accepted minimization request to the application I/F unit 23 of the same electronic information board 2c (step S152). The application I/F unit 23 transmits the received minimization request to the display sequential order control unit 24 of the OS 2020 of the same electronic information board 2c (step S153).

The display sequential order control unit 24 of the OS 2020 minimizes the image output by the application B11 and deactivates it in accordance with the received minimization request. In this manner, the display sequential order control unit 24 of the OS 2020 performs control so that the image output by the application A11 is displayed to be active (step S154).

In the seventh embodiment, the case where the image output by the application A11 is always larger than the image output by the application B11, any one of the icons 14, 15, and 16 is described. For example, when the image output by the application A11 is smaller than the image output by the application B11, the icons 14, 15, and 16 may be displayed on the application B11. In this case, the processing is executed in the same manner as the processing of the above-described steps S131 to S154, except that the processing by the client unit 20 and the processing on the client unit 20 are replaced with the processing by the client unit 80 and the processing on the client unit 80.

Main Effects of Embodiment

According to the output method of the above embodiment, the display sequential order control unit 24 (an example of output unit) of the electronic information board 2c (an example of a communication terminal) performs control to output the display by the communication application A11 (an example of a first application for communication) in preference to the display by the communication application B11 (an example of a second application for communication) after the communication application A11 and the communication application B11 are activated. The application I/F unit 23 (an example of output unit) of the electronic information board 2c performs control to cause the communication application A11 to output an icon (an example of state information) indicating a state corresponding to the event in accordance with an event generated by communication by the communication application B11. Thus, even when the display by the communication application A11 takes precedence, the state of the communication application B11 is displayed, so that the action corresponding to the event generated by the communication by the communication application B11 is not delayed.

The drawing controller 22 (an example of an accepting unit) of the electronic information board 2c accepts selection of an icon output by the communication application A11. The display sequential order control unit 24 of the electronic information board 2c performs control to output the display by the communication application B11 in preference to the display by the communication application A11 in response to acceptance of the above selection. As a result, by the operation on the display area of the communication application A11, the display by the communication application B11 can be prioritized.

The application I/F unit 23 of the electronic information board 2c performs control to cause the communication application 811 to output an icon indicating a state corresponding to the event in accordance with an event generated by communication by the communication application A11. Thus, even when the display by the communication application B11 takes precedence, the action corresponding to the event generated by the communication by the communication application A11 is not delayed.

The input reception unit 83 (an example of a reception unit) of the electronic information board 2c accepts the selection of the icon output by the communication application 811. The display sequential order control unit 24 of the electronic information board 2c performs control to output the display by the communication application A11 in preference to the display by the communication application B11 in response to the acceptance of the above selection. As a result, by the operation on the display area of the communication application B11, the display by the communication application A11 can be prioritized.

The above event is, for example, a request from the PC 8 of the communication destination of the communication application B11. As a result, even when the display by the communication application A11 takes precedence, the response to the request by the communication destination PC 8 of the communication application B1 is not delayed.

The above event is information that triggers the transition of a state. Thus, even when the display by the communication application A11 takes precedence, when the state of the communication application B11 transitions, the user can quickly take action corresponding to the state.

The application I/F unit 23 (an example of a transmission unit) of the electronic information board 2c transmits information indicating an event generated by communication by the communication application B11 to the communication application A11. Upon receiving the information indicating the event, the communication application A11 outputs a notification (an example of information) corresponding to the information indicating the event. As a result, the electronic information board 2c can prompt the user to switch the screen by this notification.

The display management table constructed in the storage unit 2000 (an example of management unit) of the electronic information board 2c manages information indicating a format in association with information indicating an event. Upon receiving the information indicating the event, the communication application A11 outputs a notification in a format indicated by the information managed in the display management table in association with the information indicating the event. As a result, the electronic information board 2c can output a notification in an optimum format according to the detected event.

Supplement to Embodiment

The communication applications A11, B11, and C11 can be stored in a recording medium readable by a computer and distributed as files with an installable format or an executable format. Moreover, another example of the above-described recording medium includes CD-R (Compact Disc Recordable), DVD (Digital Versatile Disk), Blu-ray disk or the like. Moreover, the above-described recording medium or a HD (Hard Disk) storing these programs can be provided within the country or outside the country as a program product.

Moreover, the electronic whiteboard 2, the PC 8, the relay apparatus 30, and the management apparatus 50 can be configured by a single apparatus or can be configured by a plurality of apparatuses to which the respective units (functions or means) that are divided are arbitrarily assigned.

Each function of the above-described embodiments can be realized by one or a plurality of processing circuits (processing circuitry). "Processing circuit" includes a processor including an electronic circuit programmed to execute each function by software, using a processor such as a CPU, and a device such as an ASIC (Application Specific Integrated Circuit) or a conventional circuit module designed to execute the above-described functions.

The invention claimed is:
1. A communication terminal, comprising:
processing circuitry configured to output a first display image generated by a first application for communication preferentially over a second display image generated by a second application for communication,
wherein the processing circuitry is further configured to cause the first application to display, on the first display image, an icon representing second state information indicating a second state corresponding to a second event generated by the second application, change, after the display of the icon representing the second state information indicating the second state, a manner of displaying the icon based on a current state of the second application while continuing to display the icon, accept selection of the second state information, preferentially output the second display image generated by the second application over the first display image generated by the first application in response to acceptance of selection of the second state information, and cause the second application to display, on the second display image, first state information indicating a first state corresponding to a first event generated by the first application.

2. The communication terminal according to claim 1, wherein the processing circuitry is further configured to accept selection of the first state information output by the second application, and preferentially output the first display image generated by the first application over the second display image generated by the second application in response to acceptance of selection of the first state information.

3. The communication terminal according to claim 1, the second event is a request by a communication destination of the first application.

4. The communication terminal according to claim 1, wherein the second event is information that triggers the transition of the current state of the second application.

5. The communication terminal according to claim 1, wherein the processing circuitry is further configured to send, to the first application, information indicating the second event generated by the second application, wherein the first application outputs information corresponding to the information indicating the second event, upon receiving the information indicating the second event.

6. The communication terminal according to claim 5, wherein the processing circuitry is further configured to store, in a memory, information indicating a format in association with the information indicating the second event, and wherein the first application outputs the corresponding information in a format indicated by the information stored in the memory in association with the information indicating the second event.

7. The communication terminal according to claim 1, wherein the first application outputs a first interface for giving priority to the second display image generated by the second application, and the processing circuitry preferentially outputs the second display image generated by the second application over the first display image generated by the first application, when an operation via the first interface is accepted.

8. The communication terminal according to claim 1, wherein the first application outputs a second interface for giving priority to the display image generated by the first application, and the processing circuitry is further configured to preferentially output the first display image generated by the first application over the second display image generated by the second application when an operation via the second interface is accepted.

9. A communication system, comprising:

the communication terminal according to claim 1; and another communication terminal that is a communication destination of the first application.

10. A communication system, comprising:

the communication terminal according to claim 1; and another communication terminal that is a communication destination of the second application.

11. The communication system according to claim 10, further comprising a management system to manage communication by the second application.

12. The communication terminal of claim 1, wherein the processing circuitry is further configured to display a ticker or a badge in addition to the icon, based on the current state of the second application.

13. A communication control method, comprising:

outputting a first display image generated by a first application preferentially over a second display image generated by a second application;

causing the first application to display, on the first display image, an icon representing state information indicating a state corresponding to an event generated by the second application;

changing, after the display of the icon representing the state corresponding to the event generated by the second application, a manner of displaying the icon based on a current state of the second application while continuing to display the icon;

accepting selection of the second state information, preferentially outputting the second display image generated by the second application over the first display image generated by the first application in response to accepting the selection of the second state information, and causing the second application to display, on the second display image, first state information indicating a first state corresponding to a first event generated by the first application.

* * * * *